US012615453B2

(12) United States Patent
Higuchi et al.

(10) Patent No.: US 12,615,453 B2
(45) Date of Patent: Apr. 28, 2026

(54) SOLID-STATE IMAGE CAPTURING DEVICE AND CONTROL METHOD

(71) Applicant: Nuvoton Technology Corporation Japan, Kyoto (JP)

(72) Inventors: Masahiro Higuchi, Hyogo (JP); Yutaka Abe, Osaka (JP); Takayasu Kito, Osaka (JP)

(73) Assignee: Nuvoton Technology Corporation Japan, Kyoto (JP)

( * ) Notice: Subject to any disclaimer, the term of this patent is extended or adjusted under 35 U.S.C. 154(b) by 11 days.

(21) Appl. No.: 18/887,459

(22) Filed: Sep. 17, 2024

(65) Prior Publication Data

US 2025/0016473 A1    Jan. 9, 2025

Related U.S. Application Data

(63) Continuation of application No. PCT/JP2023/006471, filed on Feb. 22, 2023.

(60) Provisional application No. 63/322,427, filed on Mar. 22, 2022.

(51) Int. Cl.
*H04N 25/77* (2023.01)
*H04N 25/59* (2023.01)
*H04N 25/709* (2023.01)

(52) U.S. Cl.
CPC ............. *H04N 25/77* (2023.01); *H04N 25/59* (2023.01); *H04N 25/709* (2023.01)

(58) Field of Classification Search
CPC ....... H04N 25/77; H04N 25/59; H04N 25/709
USPC ........................................................ 348/308
See application file for complete search history.

(56) References Cited

U.S. PATENT DOCUMENTS

| | | | |
|---|---|---|---|
| 11,165,977 B2 * | 11/2021 | Geurts ................. | H04N 25/621 |
| 2017/0070691 A1 | 3/2017 | Nishikido | |
| 2019/0043900 A1 | 2/2019 | Oka | |

FOREIGN PATENT DOCUMENTS

| | | |
|---|---|---|
| JP | 2017-055248 A | 3/2017 |
| JP | 6694605 B2 | 5/2020 |

OTHER PUBLICATIONS

International Search Report issued on May 16, 2023 in corresponding International Application No. PCT/JP2023/006471, 5 pages.

* cited by examiner

*Primary Examiner* — Joel W Fosselman
(74) *Attorney, Agent, or Firm* — Rimon P.C.

(57) ABSTRACT

A solid-state image capturing device includes a pixel which includes: a first photoelectric converter; a floating diffusion; a first charge accumulator including one electrode and an other electrode; a first transfer transistor including a source and a drain, one of which is connected to the first photoelectric converter and an other of which is connected to the floating diffusion; a second transfer transistor including a source and a drain, one of which is connected to the one electrode; a reset transistor including a source and a drain, one of which is connected to the other of the source and the drain of the second transfer transistor and an other of which is connected to a power supply line; and a switching transistor including a source and a drain, one of which is connected to the other electrode, and an other of which is connected to the power supply line.

10 Claims, 14 Drawing Sheets

SOLID-STATE IMAGE CAPTURING DEVICE AND CONTROL METHOD

CROSS REFERENCE TO RELATED APPLICATIONS

This is a continuation application of PCT International Application No. PCT/JP2023/006471 filed on Feb. 22, 2023, designating the United States of America, which is based on and claims priority of U.S. Provisional Patent Application No. 63/322,427 filed on Mar. 22, 2022. The entire disclosures of the above-identified applications, including the specifications, drawings and claims are incorporated herein by reference in their entirety.

FIELD

The present disclosure relates to a solid-state image capturing device.

BACKGROUND

Solid-state image capturing devices having various configurations have been proposed thus far.

CITATION LIST

Patent Literature

PTL 1: Japanese Unexamined Patent Application Publication No. 2017-055248
PTL 2: Japanese Patent No. 6694605

SUMMARY

Technical Problem

What has been needed in solid-state image capturing devices thus far is an increase in the speed of continuous image capturing operations in which images are captured continuously.

Accordingly, an object of the present disclosure is to provide a solid-state image capturing device and the like capable of increasing the speed of continuous image capturing operations.

Solution to Problem

A solid-state image capturing device according to one aspect of the present disclosure is a solid-state image capturing device including a pixel array in which a plurality of pixels including a first pixel are arranged in a matrix. The first pixel includes: a first photoelectric converter that converts received light into a first signal charge; a floating diffusion for accumulating the first signal charge; a first charge accumulator including a capacitor that includes a first one electrode and a first other electrode and that accumulates the first signal charge in the first one electrode; a first transfer transistor including a source and a drain, one of which is connected to the first photoelectric converter and an other of which is connected to the floating diffusion; a second transfer transistor including a source and a drain, one of which is connected to the first one electrode; a reset transistor including a source and a drain, one of which is connected to an other of the source or the drain of the second transfer transistor, and an other of which is connected to a first power supply line; an amplifying transistor including a gate connected to the floating diffusion; a selection transistor including a drain connected to a source of the amplifying transistor, and including a source connected to a vertical signal line; and a switching transistor including a source and a drain, one of which is connected to the first other electrode, and an other of which is connected to the first power supply line.

A control method according to one aspect of the present disclosure is a control method for controlling a solid-state image capturing device, and includes: a first process of raising a drive signal RS applied to a gate of the reset transistor and a drive signal GC applied to a gate of the third transfer transistor from a logic level LOW to a logic level HIGH, and subsequently raising a drive signal TG applied to a gate of the first transfer transistor from the logic level LOW to the logic level HIGH; a second process, performed after the first process, of lowering the drive signal TG from the logic level HIGH to the logic level LOW, and then lowering the drive signal RS and the drive signal GC from the logic level HIGH to the logic level LOW; a third process, performed after the second process, of raising the drive signal RS, a drive signal TGC applied to a gate of the second transfer transistor, and a drive signal PVDDSEL applied to a gate of the switching transistor from the logic level LOW to the logic level HIGH, and changing the first other electrode from a predetermined set voltage lower than a potential of the first power supply line to a power supply voltage at a potential identical to the potential of the first power supply line; and a fourth process, performed after the third process, of lowering the drive signal RS from the logic level HIGH to the logic level LOW, and then lowering the drive signal TGC and the drive signal PVDDSEL from the logic level HIGH to the logic level LOW and changing the first other electrode from the power supply voltage to the predetermined set voltage.

Advantageous Effects

According to the solid-state image capturing device and control method according to one aspect of the present disclosure, a solid-state image capturing device and the like capable of increasing the speed of continuous image capturing operations is provided.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 is a schematic diagram illustrating the configuration of a pixel array according to Variation 1.

FIG. 9 is a schematic diagram illustrating the configuration of a pixel array according to Variation 2.

DESCRIPTION OF EMBODIMENTS

Figure 1:
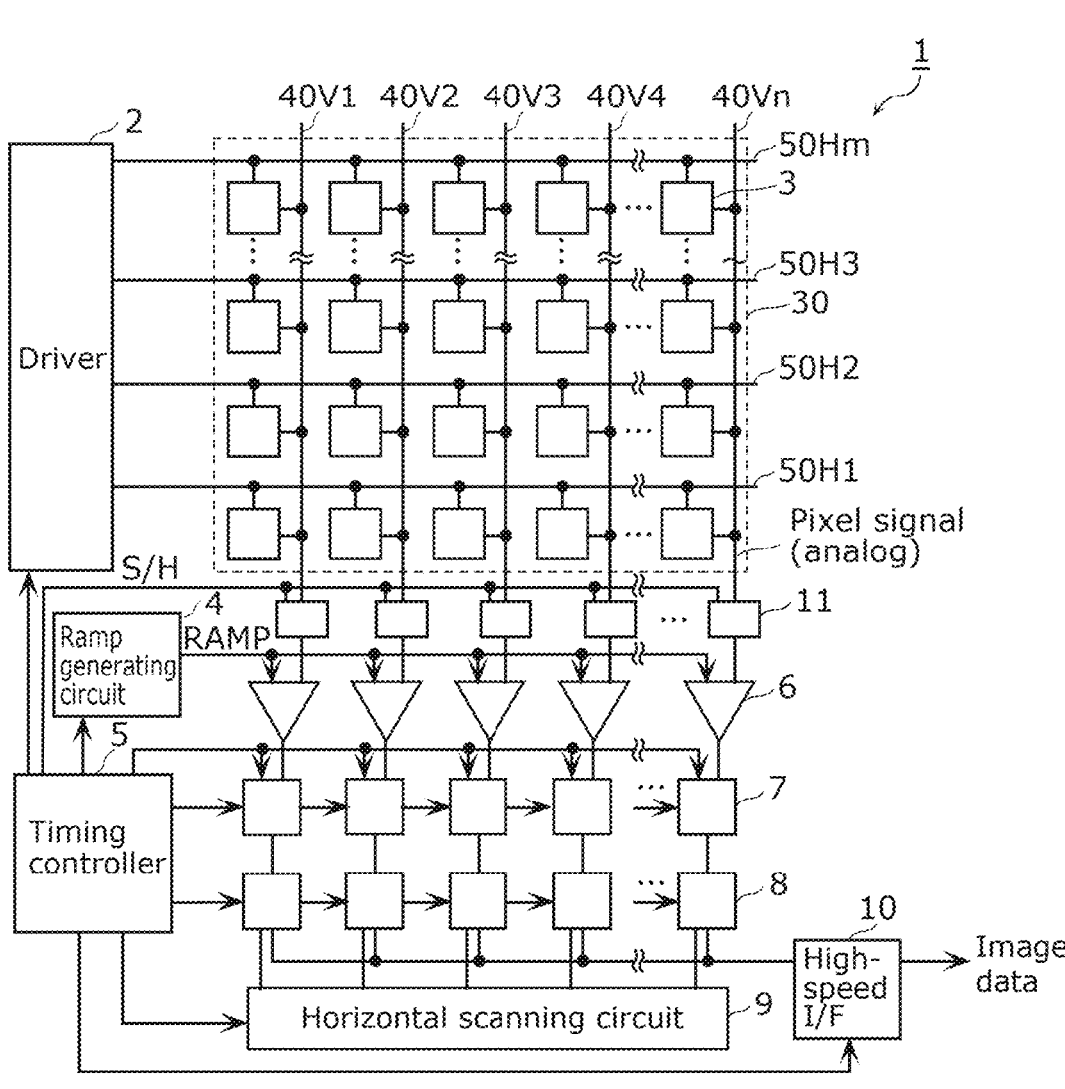
FIG. 1 is a block diagram illustrating the configuration of a solid-state image capturing device according to Embodiment 1.

Circumstances Leading to One Aspect of Present Disclosure

Various techniques for improving image quality have been introduced in solid-state image capturing devices.

For example, as a technique for expanding the dynamic range of a solid-state image capturing device, a technique is currently being used in which the dynamic range is expanded by accumulating an overflow charge exceeding a saturated charge capacity of a photoelectric converter in a charge accumulator within a pixel, to increase the accumulated charge amount for a single exposure time.

Furthermore, as a technique that does not produce distortion in images when capturing images of a subject moving at a high speed, a global shutter technique is currently being used in which a charge generated in the photoelectric converter of all pixels as a result of all pixels being exposed simultaneously by an electronic shutter is first held in a charge accumulator within the corresponding pixel, after which pixel signals are sequentially read out from all the pixels.

Thus far, the charge accumulators utilized in these techniques mainly use diffusion capacitance devices such as Lateral Overflow Integration Capacitors (LOFICs), which is formed as a junction capacitors of an impurity diffusion layer in a diffusion region of a semiconductor substrate. However, it is necessary for a charge accumulator using a diffusion capacitance device to be formed in a peripheral part separated from the photoelectric converter by a set distance within a region having a limited pixel size, so as not to reduce the saturated charge capacitance of the photoelectric converter. This limits increases in the capacitance. Accordingly, when using a charge accumulator utilizing a diffusion capacitance device, there is a limit to the extent to which the dynamic range of the solid-state image capturing device can be expanded.

On the other hand, a back-illuminated solid-state image sensor is known in which pixel driving transistors and wiring are formed on the surface of a semiconductor substrate opposite from a light-receiving surface on which photoelectric converters are formed. This makes the optical aperture ratio of the photoelectric converters relatively high, and makes it possible to increase the photoelectric conversion efficiency and improve the S/N ratio.

A high-density voltage domain capacitor, such as a Metal-Insulator-Metal (MIM) capacitor having a structure in which an insulating layer is interposed between metal wiring layers, can be formed in such a back-illuminated solid-state image sensor structure. Accordingly, using a high-density voltage domain capacitor between metal wiring layers as a charge accumulator is effective in expanding the dynamic range of a solid-state image capturing device.

In addition, recently, a layered structure solid-state image capturing device has been developed in which a semiconductor chip that forms photoelectric converters, transfer transistors, or the like, and a semiconductor chip that forms readout circuitry, post-AD conversion processing circuitry, and the like, are bonded together in a layered state.

In such a layered structure solid-state image capturing device, charges generated by the photoelectric converters are transferred to a lower-layer semiconductor chip by through-vias, which makes it possible to provide an AD converter for each of a certain number of pixel areas and operate the AD converters in parallel. Accordingly, the layered structure solid-state image capturing device can read out pixel signals faster than a past solid-state image capturing device that reads out signals in units of rows.

A charge accumulator having a sufficiently high accumulation capacity is required to further expand the dynamic range of a solid-state image capturing device. However, as mentioned above, past diffusion capacitance devices have limitations in terms of increasing the capacitances thereof, due to constraints in terms of the physical arrangement with the photoelectric converters.

On the other hand, a technique that realizes a charge accumulator as an inter-wiring capacitor has been proposed (see PTL 1, for example).

According to this technique, inter-wiring parasitic capacitance at a part where the lead wire from the node that holds a transfer charge from a pixel and the pixel power supply wiring overlap in the periphery of the light-receiving aperture of the photoelectric converter is caused to function as a charge accumulator, which eliminates the need to install a capacitor. This also makes it possible to hold the accumulated charge without reducing the optical aperture ratio of the photoelectric converter.

However, since this charge accumulator uses the parasitic capacitance between wires, a capacitance large enough for the saturated charge capacitance of the photoelectric converter cannot be achieved. Accordingly, when this charge accumulator is used to accumulate the overflow charge of the photoelectric converter during exposure to bright light, the capacitance thereof will be insufficient.

This charge accumulator temporarily holds the charge generated by the photoelectric converter during the exposure period, i.e., the charge is not transferred during the exposure period. As such, dark current from the diffuser connected to the charge holding electrode of the charge accumulator does not affect the signal charge component generated by the exposure.

However, the dark current will affect the accumulated signal charge component when this charge accumulator is used for the purpose of accumulating overflow charge during the exposure period of the photoelectric converter.

It is therefore conceivable to use the aforementioned MIM capacitor to increase the capacitance of the charge accumulator.

A technique is also known which weakens an electrical field by reducing the potential of the diffuser connected to the charge holding electrode of the charge accumulator during the exposure period in order to suppress the influence of dark current, i.e., sets the voltage on the opposing electrode side of the charge accumulator during the accumulation period to be lower than in the reset and readout periods (see PTL 2, for example).

However, in this technique, when resetting a large number of charge accumulators in a pixel array at the same time before exposure starts, the discharge of the charges accumulated in the charge accumulators, performed in the initialization of the charge accumulators, is performed on the outside of the pixel array through the power supply wiring network in the pixel array. As a result, not only do voltage drops arise in the power supply wiring network due to the wiring resistance of the charge discharge path, but the increased capacitance of the charge accumulators increase the amount of the voltage drops, resulting in a problem in that a longer time is required for the voltage drops in the power supply wiring network of the pixel array to converge. This problem impedes the acceleration of continuous image capturing operations.

This problem cannot be avoided in principle even with the layered structure solid-state image capturing device described above. It is therefore difficult to balance an increase in the dynamic range and an increase in the speed of continuous image capturing operations simply by combining the past techniques.

Accordingly, focusing on the above issues, the inventors repeatedly conducted intensive experiments and studies in order to provide a solid-state image capturing device capable of increasing the speed of continuous image capturing operations even when a large-capacity charge accumulator is installed.

As a result, the inventors arrived at the solid-state image capturing device and the like according to one aspect of the present disclosure, described below.

A solid-state image capturing device according to one aspect of the present disclosure is a solid-state image capturing device including a pixel array in which a plurality of pixels including a first pixel are arranged in a matrix. The first pixel includes: a first photoelectric converter that converts received light into a first signal charge; a floating diffusion for accumulating the first signal charge; a first charge accumulator including a capacitor that includes a first one electrode and a first other electrode and that accumulates the first signal charge in the first one electrode; a first transfer transistor including a source and a drain, one of which is connected to the first photoelectric converter and an other of which is connected to the floating diffusion; a second transfer transistor including a source and a drain, one of which is connected to the first one electrode; a reset transistor including a source and a drain, one of which is connected to an other of the source or the drain of the second transfer transistor, and an other of which is connected to a first power supply line; an amplifying transistor including a gate connected to the floating diffusion; a selection transistor including a drain connected to a source of the amplifying transistor, and including a source connected to a vertical signal line; and a switching transistor including a source and a drain, one of which is connected to the first other electrode, and an other of which is connected to the first power supply line.

According to the solid-state image capturing device configured as described above, the charge accumulated in the first charge accumulator can be discharged from the first charge accumulator by putting the switching transistor in the conductive state and shorting the first one electrode and the first other electrode via the first power supply line. In other words, the charge accumulated in the first charge accumulator flows from the first one electrode to the first other electrode through the short-circuit path traversing the first power supply line, formed in the vicinity of the first pixel, and is discharged as a result.

Accordingly, even if the first charge accumulator has a large capacity, the amount by which the voltage drops in the power supply wiring network in the pixel array is suppressed by the discharge of the charge accumulated in the first charge accumulator when the first charge accumulator is reset.

In this manner, according to the solid-state image capturing device configured as described above, even if the first charge accumulator has a large capacity, an increase in the length of time required for the voltage drop in the power supply wiring network within the pixel array to converge is suppressed, and the speed of continuous image capturing operations can therefore be increased.

Additionally, each of the plurality of pixels may be the first pixel.

Through this, each pixel constituting the pixel array to discharge the charge accumulated in the first charge accumulator from the first charge accumulator through a short-circuit path, formed by the switching transistor in the pixel, that shorts the first one electrode and the first other electrode in the pixel.

Additionally, at least one of the plurality of pixels may be a second pixel different from the first pixel.

Through this, each first pixel among the pixels constituting the pixel array can discharge the charge accumulated in the first charge accumulator from the first charge accumulator through the short-circuit path that shorts the first one electrode and the first other electrode of that pixel, and that is formed by the switching transistor in that pixel. Additionally, each second pixel can discharge the charge accumulated in the first charge accumulator from the first charge accumulator through the short-circuit path that shorts the first one electrode and the first other electrode in the second pixel, and that is formed by the switching transistor in the first pixel located in the vicinity of the second pixel.

Additionally, the first pixel may further include an overflow transistor including a source and a drain, one of which is connected to the first photoelectric converter and an other of which is connected to the first one electrode, and the first one electrode may be connected to the first photoelectric converter by the overflow transistor.

Through this, the height of a potential barrier between the first photoelectric converter and the first one electrode can be controlled by controlling the gate voltage of the overflow transistor.

Additionally, the first pixel may further include a third transfer transistor including a source and a drain, one of which is connected to the other of the source or the drain of the second transfer transistor, and an other of which is connected to the floating diffusion.

Through this, a first signal charge can also be accumulated in the source or the drain of the third transistor.

Additionally, the first pixel further may further include: a second photoelectric converter that converts received light into a second signal charge; a second charge accumulator constituted by a capacitor that includes a second one electrode and a second other electrode and that accumulates the second signal charge in the second one electrode; a fourth transfer transistor including a source and a drain, one of which is connected to the second photoelectric converter and an other of which is connected to the floating diffusion; and a fifth transfer transistor including a source and a drain, one of which is connected to the second one electrode, and an other of which is connected to the other of the source or the drain of the second transfer transistor.

Through this, a first signal charge converted by the first photoelectric converter and a second signal charge converted by the second photoelectric converter can be accumulated in a single shared floating diffusion.

Additionally, one or more first pixels may be disposed in each of columns of the pixel array, the one or more first pixels each being the first pixel, and the solid-state image capturing device may further include a plurality of variable voltage sources in one-to-one correspondence with the columns of the pixel array, the plurality of variable voltage sources each exclusively selecting one voltage among a first voltage at a same potential as a potential of the first power supply line and a second voltage at a potential different from the potential of the first power supply line, and each outputting the one voltage to the first other electrode in each of the one or more first pixels disposed in a corresponding one of the columns.

Through this, for each column of the pixel array, the first other voltage in at least one first pixel disposed in that column can be switched to either the first voltage or the second voltage at the same timing.

Additionally, the drain of the amplifying transistor may be connected to a second power supply line that is not connected to the first power supply line in the pixel array.

Through this, fluctuations in the voltage of the drain of the amplifying transistor caused by the influence of voltage drops in the first power supply line can be suppressed.

Additionally, a plurality of first pixels, each of which is the first pixel, and a plurality of second pixels, each being the second pixel, may be provided; the plurality of first pixels may be irradiated with light of a first color passing through a color filter that filters light passing through the color filter, and the plurality of second pixels may be irradiated with light of a second color passing through the color filter, the second color being different from the first color; and for each second pixel among the plurality of second pixels, a relative positional relationship between the second pixel and a first pixel located closest to the second pixel may be identical throughout the pixel array.

Through this, variations in the characteristics of pixels where light of the same color is irradiated can be suppressed.

A control method according to one aspect of the present disclosure is a control method for controlling a solid-state image capturing device, and includes: a first process of raising a drive signal RS applied to a gate of the reset transistor and a drive signal GC applied to a gate of the third transfer transistor from a logic level LOW to a logic level HIGH, and subsequently raising a drive signal TG applied to a gate of the first transfer transistor from the logic level LOW to the logic level HIGH; a second process, performed after the first process, of lowering the drive signal TG from the logic level HIGH to the logic level LOW, and then lowering the drive signal RS and the drive signal GC from the logic level HIGH to the logic level LOW; a third process, performed after the second process, of raising the drive signal RS, a drive signal TGC applied to a gate of the second transfer transistor, and a drive signal PVDDSEL applied to a gate of the switching transistor from the logic level LOW to the logic level HIGH, and changing the first other electrode from a predetermined set voltage lower than a potential of the first power supply line to a power supply voltage at a potential identical to the potential of the first power supply line; and a fourth process, performed after the third process, of lowering the drive signal RS from the logic level HIGH to the logic level LOW, and then lowering the drive signal TGC and the drive signal PVDDSEL from the logic level HIGH to the logic level LOW and changing the first other electrode from the power supply voltage to the predetermined set voltage.

According to the above control method, a short-circuit path that shorts the first one electrode and the first other electrode via the first power supply line is formed in the vicinity of the first pixel during a period after the third step is executed and before the fourth step is executed. Accordingly, the charge accumulated in the first charge accumulator during the period up until the third step is executed can be discharged by flowing from the first one electrode to the first other electrode through the short-circuit path formed in the vicinity of the first pixel, during the period after the third step is executed and before the fourth step is executed.

Accordingly, even if the first charge accumulator has a large capacity, the amount by which the voltage drops in the power supply wiring network in the pixel array is suppressed by the discharge of the charge accumulated in the first charge accumulator during the period up until the third step is executed.

In this manner, according to the control method described above, even if the first charge accumulator has a large capacity, an increase in the length of time required for the voltage drop in the power supply wiring network within the pixel array to converge is suppressed, and the speed of continuous image capturing operations by the solid-state image capturing device can therefore be increased.

Specific examples of the solid-state image capturing device according to one aspect of the present disclosure will be described hereinafter with reference to the drawings. Each of the following embodiments describes a specific example of the present disclosure. As such, the numerical values, shapes, constituent elements, arrangements and connection states of constituent elements, steps, orders of steps, and the like in the following embodiments are merely examples, and are not intended to limit the present disclosure. Additionally, the drawings are schematic diagrams, and are not necessarily exact illustrations. Configurations that are substantially the same are given the same reference signs in the drawings, and redundant descriptions will be omitted or simplified.

Embodiment 1

Configuration

FIG. 1 is a block diagram illustrating the configuration of solid-state image capturing device 1 according to Embodiment 1.

As illustrated in FIG. 1, solid-state image capturing device 1 includes pixel array 30, driver 2, ramp generating circuit 4, timing controller 5, a plurality of sample holders 11, a plurality of comparators 6, a plurality of counters 7, a plurality of digital memories 8, horizontal scanning circuit 9, and high-speed interface 10.

Pixel array 30 is configured with a plurality of pixels 3 arranged in a matrix of m (where m is an integer of 2 or more) rows and n (where n is an integer of 2 or more) columns.

Pixel array 30 further includes n vertical signal lines 40V (corresponding to 40V1 to 40Vn, in FIG. 1) which extend in the column direction and each of which is connected to m pixels 3 arranged in the column direction, and m control signal line groups 50H (corresponding to 50H1 to 50Hm in FIG. 1) which extend in the row direction and each of which is connected to n pixels 3 arranged in the row direction.

Here, each of the n vertical signal lines 40V is a single signal line, but each of the m control signal line groups 50H is constituted by a plurality of signal lines.

In the present specification, the row direction in pixel array 30 will be called the "horizontal direction", and the column direction will be called the "vertical direction".

Driver 2 drives each pixel 3 of pixel array 30. In other words, driver 2 controls each pixel 3 of pixel array 30.

Driver 2 drives all pixels 3 of pixel array 30 simultaneously, for example, or drives pixels 3 of pixel array 30 in units of rows.

Driver 2 is constituted by, for example, a shift register, an address decoder, or the like.

Although the specific configurations thereof are not illustrated, driver 2 has two scanning systems, namely a readout scanning system and sweep-out scanning system.

The readout scanning system selects pixels 3 of pixel array 30 in units of rows to read out pixel signals from pixels 3 after exposure.

The sweep-out scanning system performs sweep-out scanning, for a readout row for which the readout scanning system performs readout scanning, before the readout scanning by a length of time equivalent to the exposure time.

This sweep-out scanning removes unwanted signal charges from first photoelectric converter 109 (described later) of pixels 3 in the readout row. What is known as an "electronic shutter operation", in which first photoelectric converter 109 is reset, is performed as a result. This "electronic shutter operation" is an operation in which the accumulation of a new signal charge is started by discarding the signal charge accumulated in first photoelectric converter 109 and starting a new exposure.

The signal read out through the readout operation is a signal corresponding to the amount of light received by first photoelectric converter 109 after the readout operation or the electronic shutter operation performed immediately therebefore. The period from the readout timing in the immediately-previous readout operation or the sweep-out timing in the electronic shutter operation to the readout timing in the current readout operation is the exposure period.

The signals output from pixels 3 in the row selected and scanned by driver 2 are output to the plurality of sample holders 11 through vertical signal lines 40V1 to 40Vn on a column-by-column basis. Here, the plurality of sample holders 11 are constituted by n sample holders 11 corresponding one-to-one with the n vertical signal lines 40V. Likewise, the plurality of comparators 6 (described later) are constituted by n comparators 6 corresponding one-to-one with the n vertical signal lines 40V; the plurality of counters 7 (described later) are constituted by n counters 7 corresponding one-to-one with the n vertical signal lines 40V; and the plurality of digital memories 8 (described later) are constituted by n digital memories 8 corresponding one-to-one with the n vertical signal lines 40V.

Sample holder 11 temporarily holds, or does not hold, the signal output from the corresponding vertical signal line 40V, and outputs the signal to the corresponding comparator 6.

Ramp generating circuit 4 outputs reference ramp signal RAMP to which comparator 6 refers for comparison.

Comparator 6 compares reference ramp signal RAMP with the signal output from sample holder 11.

Counter 7 detects a count value at the point in time when the comparison by comparator 6 indicates a match.

Digital memory 8 stores the count value detected by counter 7.

For the sake of simplicity, the series of operations from the comparison by comparator 6 to the count value being stored by digital memory 8 will also be referred to as "AD conversion" hereinafter. Additionally, the count value stored in digital memory 8 will also be referred to as "image data" hereinafter.

Note that when the AD conversion is performed, digital correlated double sampling (digital CDS) processing is also performed by calculating a difference between the result of AD-converting the output signal read out from pixel 3 in a reset state and the result of AD-converting the output signal read out from pixel 3 through the readout operation. This digital CDS removes reset noise arising during the readout operations, pattern noise unique to each pixel 3 due to, for example, variations in the thresholds of amplifying transistors 105 (described later) in pixels 3, noise produced by comparator 6, and the like.

By sequentially selecting and scanning digital memories 8, horizontal scanning circuit 9 outputs the image data stored in digital memories 8 to high-speed interface 10 in order.

Horizontal scanning circuit 9 is constituted by, for example, a shift register, an address decoder, or the like.

High-speed interface 10 outputs the image data to a signal processor (not shown) in a later stage in an output format compliant with a predetermined serial communication standard (subLVDS, MIPI, SLVS, or the like).

Timing controller 5 generates timing signals used by each of driver 2, ramp generating circuit 4, counter 7, digital memory 8, horizontal scanning circuit 9, and high-speed interface 10.

Timing controller 5 is constituted by a timing generator or the like, for example.

Although solid-state image capturing device 1 configured as described above is an example of a configuration in which the signal processor (not shown) in the later stage performs various types of image processing on the image data output from high-speed interface 10, other configurations are possible. For example, the configuration may be such that, for example, solid-state image capturing device 1 has the signal processor built in, and takes, as the image data, the image data output from high-speed interface 10 after the data has been subjected to various types of image processing by the built-in signal processor.

Although solid-state image capturing device 1 configured as described above is an example of a configuration including n comparators 6 corresponding one-to-one to the n vertical signal lines, other configurations are possible. For example, the configuration may be such that solid-state image capturing device 1 includes one comparator 6 shared by a plurality of vertical signal lines 40V, or a plurality of comparators 6 are connected to a single vertical signal line to perform AD conversion in an interleaving manner.

Figure 2:
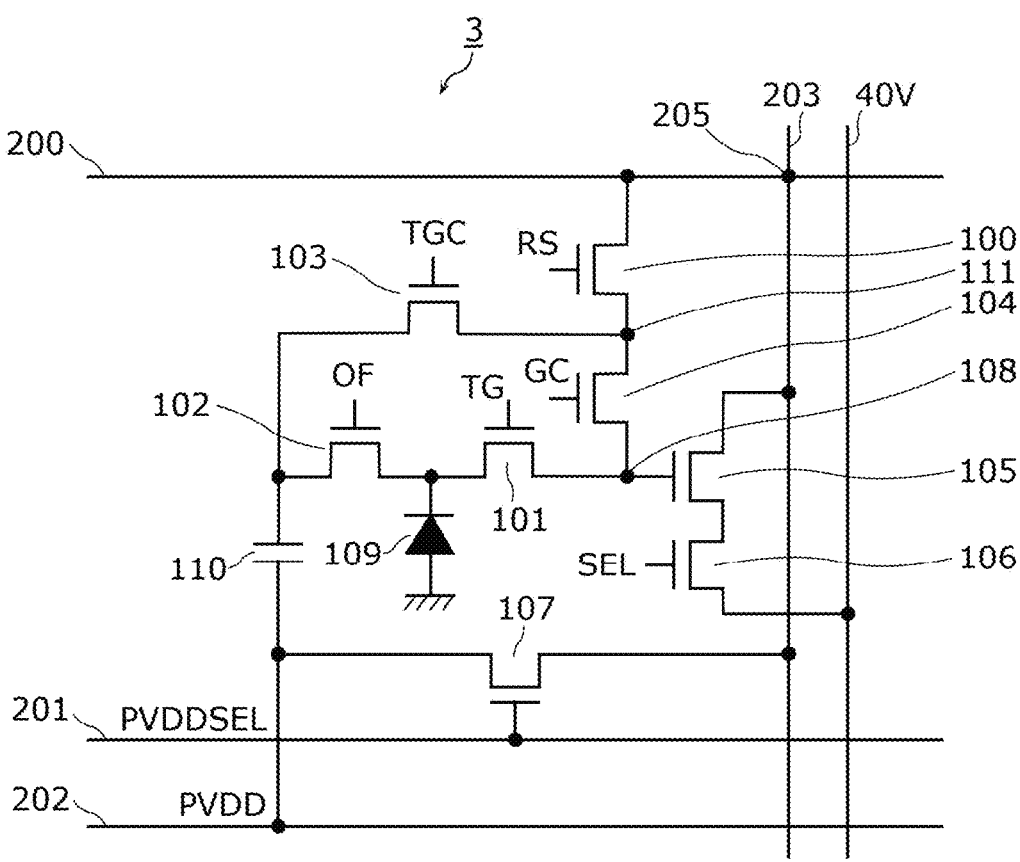
FIG. 2 is a circuit diagram illustrating the configuration of a pixel according to Embodiment 1.

FIG. 2 is a circuit diagram illustrating the configuration of pixel 3.

Figure 3:
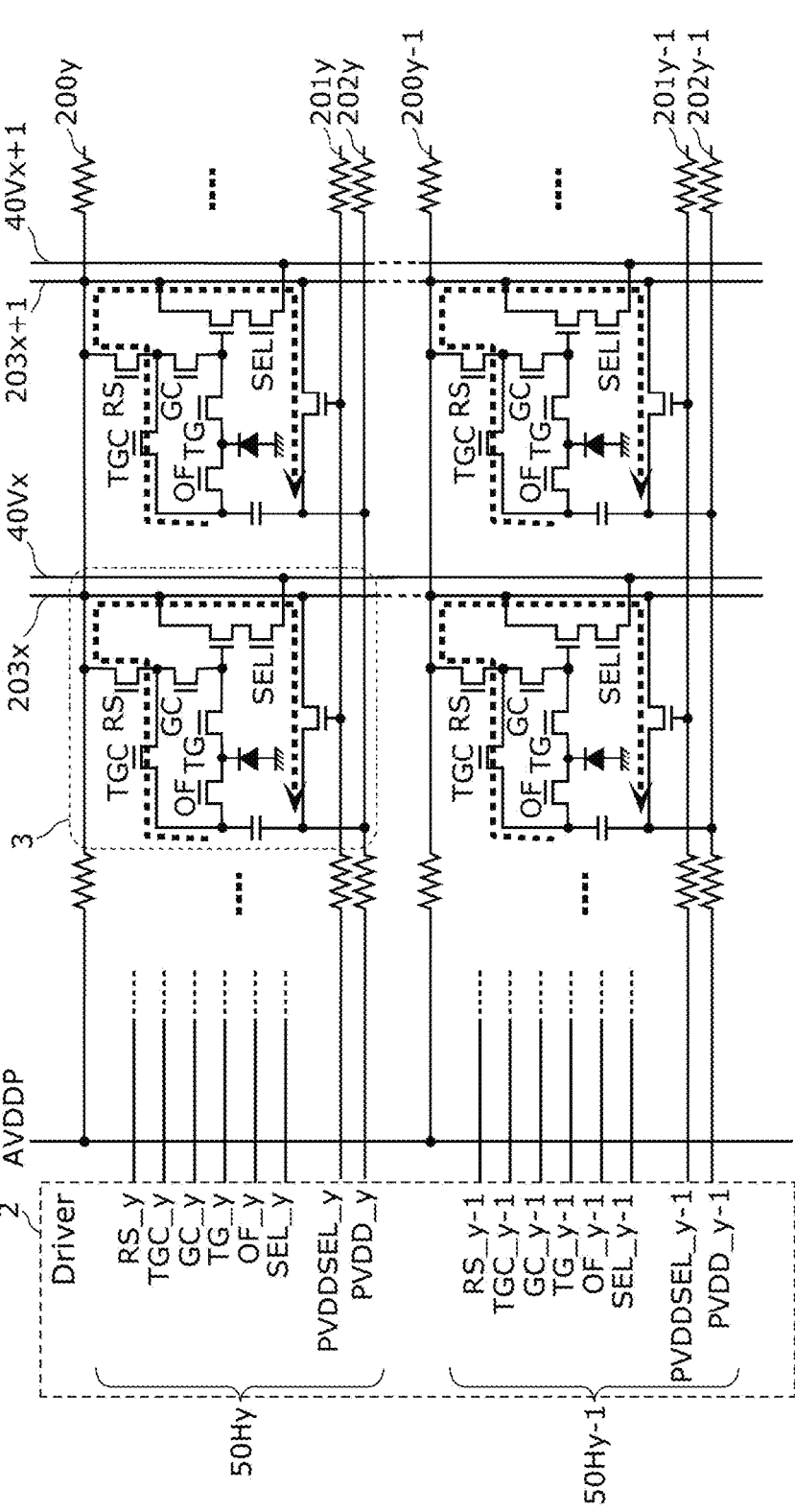
FIG. 3 is a circuit diagram illustrating the circuit configuration in the vicinity of a pixel located in row y and column x in a pixel array according to Embodiment 1.

FIG. 3 is a circuit diagram illustrating the circuit configuration in the vicinity of pixel 3 located in row y and column x in pixel array 30.

As illustrated in FIG. 2, pixel 3 includes first photoelectric converter 109, floating diffusion 108, first charge accumulator 110, first transfer transistor 101, second transfer transistor 103, reset transistor 100, amplifying transistor 105, selection transistor 106, switch transistor 107, overflow transistor 102, third transfer transistor 104, and potential part 111.

Additionally, as illustrated in FIGS. 2 and 3, drive signal RS, drive signal TG, drive signal TGC, drive signal OF, drive signal GC, drive signal SEL, drive signal PVDDSEL, and variable voltage PVDD are supplied to pixel 3 from driver 2 via control signal line group 50H.

Drive signal RS, drive signal TG, drive signal TGC, drive signal OF, drive signal GC, drive signal SEL, and drive signal PVDDSEL are pulse signals that take on a binary value, namely logic level HIGH and logic level LOW.

Variable voltage PVDD is a variable voltage in which the voltage level is either a first voltage of the same potential as a power supply voltage supplied to pixel array 30 or a second voltage lower than the first voltage.

As illustrated in FIGS. 2 and 3, pixel 3 is supplied by power supply line 200 (corresponding to 200y and 200y−1 in FIG. 3) extending horizontally for each row of pixels in pixel array 30, and power supply line 203 (corresponding to 203x and 203x+1 in FIG. 3) extending vertically for each row of pixels in pixel array 30.

Each power supply line 200 and each power supply line 203 are connected at intersection point 205 near the corresponding pixel 3. In other words, pixel array 30 includes a grid-shaped power supply wiring network constituted by m power supply lines 200 extending in the horizontal direction and n power supply lines 203 extending in the vertical direction.

First photoelectric converter 109 converts received light into a signal charge. In other words, first photoelectric converter 109 generates a signal charge based on an amount of light received, and accumulates the generated signal charge.

First photoelectric converter 109 is implemented by a photodiode having a PN junction, for example.

Floating diffusion 108 is a capacitor for accumulating the signal charge generated by first photoelectric converter 109. The potential of floating diffusion 108 is varied by accumulating the signal charge. In other words, floating diffusion 108 converts the signal charge into a voltage signal.

First charge accumulator 110 is constituted by a capacitor which has a first one electrode and a first other electrode and which accumulates a signal charge generated by first photoelectric converter 109 at the first one electrode.

In the example of the configuration of pixel 3 illustrated in FIG. 2, the first one electrode of first charge accumulator 110 is connected to first photoelectric converter 109 by overflow transistor 102.

First charge accumulator 110 is implemented by a high-density voltage domain capacitor between metal wiring layers (e.g., a MIM capacitor) formed on the surface of the semiconductor substrate on which pixels 3 are formed, for example, on the surface opposite from a light-receiving surface on which first photoelectric converter 109 is formed.

Variable voltage PVDD is supplied from driver 2 to the first other electrode of first charge accumulator 110.

First transfer transistor 101 has a source and a drain, one of which is connected to first photoelectric converter 109 and the other of which is connected to floating diffusion 108.

First transfer transistor 101 is an NMOS transistor, and drive signal TG is applied to the gate thereof. Accordingly, first transfer transistor 101 enters a nonconductive state when drive signal TG goes to logic level LOW, and enters a conductive state when drive signal TG goes to logic level HIGH.

When first transfer transistor 101 enters the conductive state, the signal charge accumulated in first photoelectric converter 109 is transferred to floating diffusion 108 through first transfer transistor 101.

Second transfer transistor 103 has a source and a drain, one of which is connected to the first one electrode of first charge accumulator 110 and the other of which is connected to potential part 111.

Second transfer transistor 103 is an NMOS transistor, and drive signal TGC is applied to the gate thereof. Accordingly, second transfer transistor 103 enters a nonconductive state when drive signal TGC goes to logic level LOW, and enters a conductive state when drive signal TGC goes to logic level HIGH.

When second transfer transistor 103 enters the conductive state, the potential of the first one electrode of first charge accumulator 110 and the potential of potential part 111 are coupled.

Reset transistor 100 has a source and a drain, one of which is connected to the other of the source or the drain of second transfer transistor 103, and the other of which is connected to power supply line 200.

Reset transistor 100 is an NMOS transistor, and drive signal RS is applied to the gate thereof. Accordingly, reset transistor 100 enters a nonconductive state when drive signal RS goes to logic level LOW, and enters a conductive state when drive signal RS goes to logic level HIGH.

When reset transistor 100 enters the conductive state, if second transfer transistor 103 is also in the conductive state, the potential of the first one electrode of first charge accumulator 110 is reset to the power supply voltage through the power supply line 200. If third transfer transistor 104 (described later) is also in the conductive state, the potential of floating diffusion 108 is reset to the power supply voltage through power supply line 200. If third transfer transistor 104 (described later) and first transfer transistor 101 are also in the conductive state, the potential of first photoelectric converter 109 is reset to the power supply voltage through power supply line 200.

Amplifying transistor 105 has a gate connected to floating diffusion 108, a drain connected to power supply line 203, and a source connected to a drain of selection transistor 106 (described later).

Amplifying transistor 105 is an NMOS transistor, and forms a source follower circuit with a constant current source (not shown) disposed in vertical signal line 40V, which is connected via selection transistor 106 (described later).

Selection transistor 106 has a drain connected to the source of amplifying transistor 105, and a source connected to vertical signal line 40V.

Selection transistor 106 is an NMOS transistor, and drive signal SEL is applied to the gate thereof.

Accordingly, selection transistor 106 enters a nonconductive state when drive signal SEL goes to logic level LOW, and enters a conductive state when drive signal SEL goes to logic level HIGH.

When selection transistor 106 enters the conductive state, a signal output from amplifying transistor 105 is output to vertical signal line 40V via selection transistor 106. In other words, when selection transistor 106 enters the conductive state, pixel 3 enters a selected state.

Overflow transistor 102 has a source and a drain, one of which is connected to first photoelectric converter 109 and the other of which is connected to the first one electrode of first charge accumulator 110.

Overflow transistor 102 is an NMOS transistor, and drive signal OF is applied to the gate thereof.

Accordingly, by controlling drive signal OF, the height of a potential barrier between first photoelectric converter 109 and the first one electrode of first charge accumulator 110 can be controlled.

Of the signal charges generated by first photoelectric converter 109, a signal charge having a potential exceeding the stated potential barrier is transferred from first photoelectric converter 109 to first charge accumulator 110.

An example is also conceivable in which pixel 3 does not include overflow transistor 102, and first photoelectric converter 109 and the first one electrode of first charge accumulator 110 are directly connected. In this configuration example, the height of the potential barrier between first photoelectric converter 109 and the first one electrode of first charge accumulator 110 is fixed.

Third transfer transistor 104 has a source and a drain, one of which is connected to the other of the source or the drain of second transfer transistor 103, and the other of which is connected to floating diffusion 108.

Third transfer transistor 104 is an NMOS transistor, and drive signal GC is applied to the gate thereof. Accordingly, third transfer transistor 104 enters a nonconductive state when drive signal GC goes to logic level LOW, and enters a conductive state when drive signal GC goes to logic level HIGH.

When third transfer transistor 104 enters the conductive state, the potential of potential part 111 (described later) and the potential of floating diffusion 108 are coupled.

Potential part 111 is a capacitor for accumulating the signal charge generated by first photoelectric converter 109.

Potential part 111 is connected to the other of the source or the drain of second transfer transistor 103, the one of the source and the drain of reset transistor 100, and the one of the source and the drain of third transfer transistor 104.

An example is also conceivable in which pixel 3 does not include third transfer transistor 104 and potential part 111, and the other of the source and the drain of second transfer transistor 103 is connected directly to floating diffusion 108. In this configuration example, the signal charge generated by first photoelectric converter 109 cannot be accumulated by floating diffusion 108 and potential part 111 individually.

Switch transistor 107 has a source and a drain, one of which is connected to the first other electrode of first charge accumulator 110 and the other of which is connected to power supply line 203. As mentioned above, power supply line 200 and power supply line 203 are connected at intersection point 205. It can therefore also be said that the other of the source and the drain of switch transistor 107 is connected to power supply line 200.

Switch transistor 107 is an NMOS transistor, and drive signal PVDDSEL is applied to the gate thereof. Accordingly, switch transistor 107 enters a nonconductive state when drive signal PVDDSEL goes to logic level LOW, and enters a conductive state when drive signal PVDDSEL goes to logic level HIGH.

When switch transistor 107 enters the conductive state, the first other electrode of first charge accumulator 110 and power supply line 203 are shorted.

It should be noted that switch transistor 107 is preferably a transistor having a threshold voltage higher than the threshold voltage of the other transistors constituting pixel 3. This makes it possible to suppress leakage current flowing between power supply line 203 and PVDD line 202, which supplies PVDD, when switch transistor 107 is in a nonconductive state during a period when the potential of power supply line 203 and the potential of PVDD are different from each other.

An example is also conceivable in which in pixel 3, the other of the source or the drain of switch transistor 107 is connected to power supply line 200.

Whether the other of the source or the drain of switch transistor 107 is connected to power supply line 200 or power supply line 203 may be determined to use the connection through which a resistance value of a short-circuit path between the first one electrode and the first other electrode of first charge accumulator 110, formed by putting second transfer transistor 103, reset transistor 100, and switch transistor 107 into the conductive state, is lower.

Operations

Operations performed by solid-state image capturing device 1 configured as described above will be described hereinafter.

Figure 4:
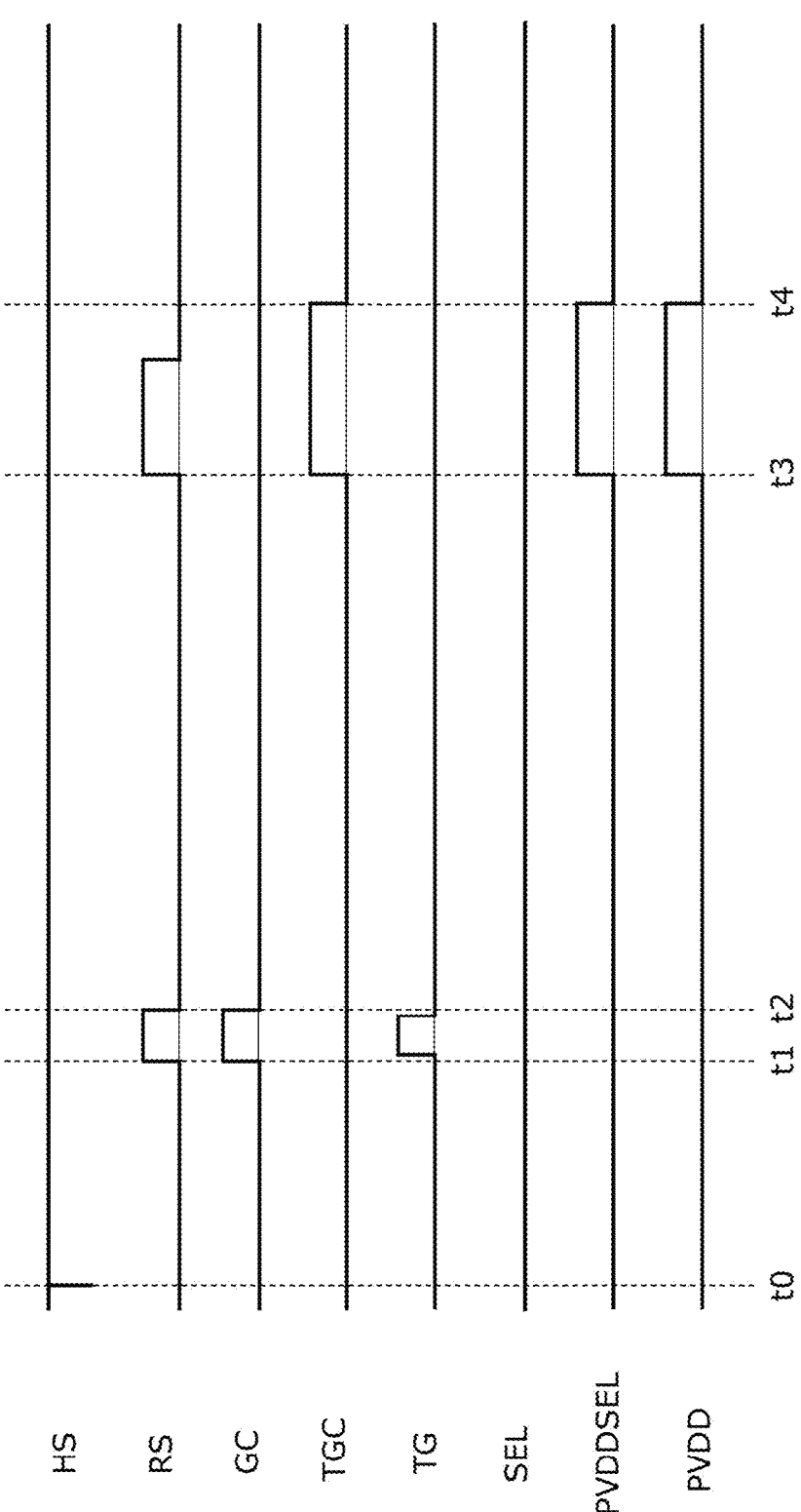
FIG. 4 is a timing chart illustrating exposure start processing performed by the solid-state image capturing device according to Embodiment 1.

FIG. 4 is a timing chart illustrating exposure start processing, performed by solid-state image capturing device 1, for starting the exposure of pixel 3. More specifically, FIG. 4 is a timing chart indicating horizontal synchronization signal HS, drive signal RS, drive signal GC, drive signal TGC, drive signal TG, drive signal SEL, drive signal PVDDSEL, and variable voltage PVDD in the exposure start processing performed by solid-state image capturing device 1.

The exposure start processing is performed in a predetermined scanning order, e.g., for each row of pixel array 30, or for each plurality of rows.

As illustrated in FIG. 4, the exposure start processing is started when horizontal synchronization signal HS falls at time t0.

Then, at time t1, drive signal RS and drive signal GC rise, and slightly thereafter, drive signal TG rises. As a result, reset transistor 100, third transfer transistor 104, and first transfer transistor 101 enter the conductive state, and the signal charge accumulated in potential part 111, floating diffusion 108, and first photoelectric converter 109 is discharged to power supply line 200. The potentials of potential part 111, floating diffusion 108, and first photoelectric converter 109 are then reset to the power supply voltage.

Then, drive signal TG falls, and at time t2, which is slightly thereafter, drive signal RS and drive signal GC fall as well. As a result, first transfer transistor 101, reset transistor 100, and third transfer transistor 104 enter the nonconductive state. An exposure/accumulation operation performed by first photoelectric converter 109 is started when first transfer transistor 101 enters the nonconductive state.

Then, at time t3, drive signal RS and drive signal TGC rise. As a result, reset transistor 100 and second transfer transistor 103 enter the conductive state, and the signal charge accumulated in first charge accumulator 110 is discharged to power supply line 200. The potential of first charge accumulator 110 is then reset to the power supply voltage.

At this time, once time t3 arrives, drive signal PVDDSEL also rises. Switch transistor 107 enters the conductive state as a result. Furthermore, at this time, once time t3 arrives, the potential of variable voltage PVDD changes from a predetermined set voltage lower than the potential of power supply line 200 to a power supply voltage at the same potential as the potential of power supply line 200.

Accordingly, the first one electrode and the first other electrode of first charge accumulator 110 are in a shorted state due to a short-circuit path traversing second transfer transistor 103, reset transistor 100, power supply line 200, power supply line 203, and switch transistor 107.

Accordingly, as indicated by the broken line arrow in FIG. 3, after being discharged from the first one electrode of first charge accumulator 110 to power supply line 200, most of the signal charge accumulated in first charge accumulator 110 flows to the first other electrode of first charge accumulator 110, not toward the exterior of pixel array 30 through the power supply wiring network of pixel array 30, which has a relatively high wiring resistance, but rather through the stated short-circuit path, which has a lower resistance.

In this manner, most of the current flowing when first charge accumulator 110 is reset does not flow toward the exterior of pixel array 30 through the power supply wiring network provided in pixel array 30, but rather through the stated short-circuit path, which is formed in a local region near the corresponding pixel 3.

Accordingly, even if first charge accumulator 110 has a large capacity, the amount by which the voltage drops in the power supply wiring network in pixel array 30 is suppressed by the discharge of the charge accumulated in first charge accumulator 110 when first charge accumulator 110 is reset. The same applies when the number of pixels 3 constituting pixel array 30 is increased greatly.

This makes it possible to suppress an increase in the time required for the voltage drop in the power supply wiring network within pixel array 30 to converge after first charge accumulator 110 is reset.

Then, drive signal RS falls, and at time t4, which is slightly thereafter, drive signal TGC and drive signal PVDD-SEL fall as well. As a result, reset transistor 100, second transfer transistor 103, and switch transistor 107 enter the nonconductive state. At time t4, the exposure/accumulation operation of first charge accumulator 110 is started.

Also, at time t4, the potential of variable voltage PVDD is changed to a predetermined set voltage lower than the potential during the reset period of first charge accumulator 110. This makes it possible to suppress the effects of dark current from a diffusion region connected to the first other electrode of first charge accumulator 110 during an exposure/accumulation operation period.

Then, when horizontal synchronization signal HS falls, the exposure start processing of the next row, or the next plurality of rows, is started again.

Figure 5:
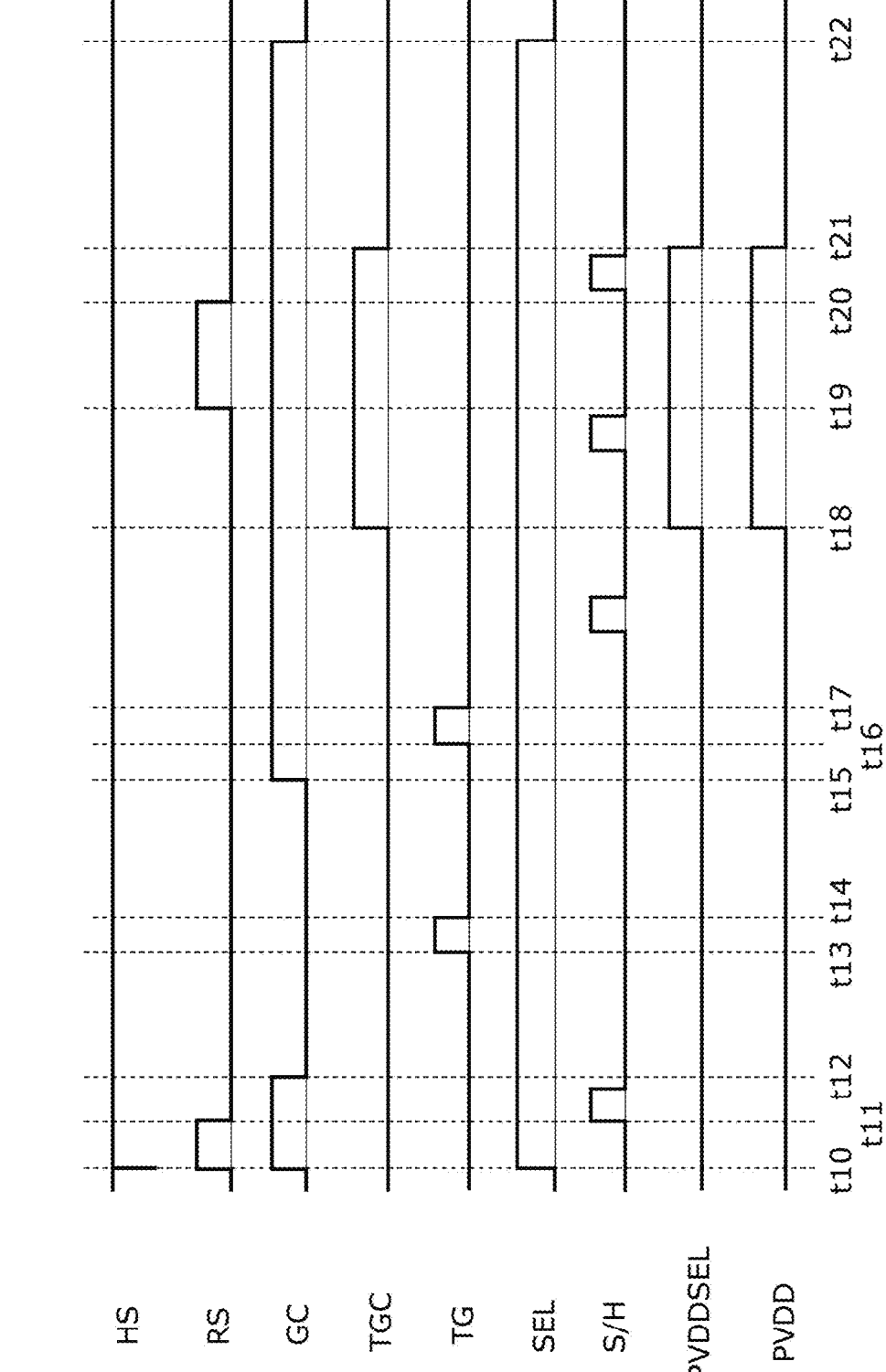
FIG. 5 is a timing chart illustrating readout processing performed by the solid-state image capturing device according to Embodiment 1.

FIG. 5 is a timing chart illustrating readout processing performed by solid-state image capturing device 1 for reading out a pixel signal from pixel 3. More specifically, FIG. 5 is a timing chart indicating horizontal synchronization signal HS, drive signal RS, drive signal GC, drive signal TGC, drive signal TG, drive signal SEL, drive signal S/H, drive signal PVDDSEL, and variable voltage PVDD in the readout processing performed by solid-state image capturing device 1. Here, drive signal S/H is a pulse signal that controls sample holder 11 and that takes on a binary value, namely logic level HIGH and logic level LOW.

The readout processing is processing performed in a predetermined scanning order for each row of pixel array 30, or for each plurality of rows, for example, and is processing performed in each row after a predetermined length of time has passed following the exposure start processing indicated in FIG. 4.

As illustrated in FIG. 5, the readout processing is started when horizontal synchronization signal HS falls at time t10.

At the same time as horizontal synchronization signal HS falls, that is, at time t10, drive signal RS and drive signal GC rise. As a result, reset transistor 100 and third transfer transistor 104 enter the conductive state, and the signal charge accumulated in potential part 111 and floating diffusion 108 is discharged to power supply line 200. The potentials of potential part 111 and floating diffusion 108 are then reset to the power supply voltage.

At this time, that is, at time t10, drive signal SEL also rises, and thus selection transistor 106 enters the conductive state. Accordingly, amplifying transistor 105 outputs a pixel signal, indicating a voltage in the state in which floating diffusion 108 has been reset to the power supply voltage, to vertical signal line 40V via selection transistor 106.

Then, at time t11, drive signal RS falls. Reset transistor 100 enters the nonconductive state as a result. At this time, third transfer transistor 104 is in the conductive state, and thus the potential of floating diffusion 108 connected to the gate of amplifying transistor 105 is coupled with the potential of potential part 111. In other words, this is a state in which the charge-voltage conversion coefficient (also called "conversion gain" hereinafter) of floating diffusion 108 is low. This state will be called "low conversion gain" (LCG) hereinafter.

The sample holder in the later stage temporarily holds the pixel signal output from amplifying transistor 105 at time t11 as a LCG reset pixel signal.

Then, at time t12, drive signal GC falls. Third transfer transistor 104 enters the nonconductive state as a result. At this time, third transfer transistor 104 is in the nonconductive state, and thus the potential of floating diffusion 108 connected to the gate of amplifying transistor 105 is decoupled from the potential of potential part 111. In other words, this is a state in which the conversion gain of floating diffusion 108 is high. This state will be called "high conversion gain" (HCG) hereinafter.

The pixel signal output from amplifying transistor 105 at time t12 is AD-converted as a HGC reset pixel signal.

Then, at time t13, drive signal TG rises. First transfer transistor 101 enters the conductive state as a result. Accordingly, the signal charge accumulated in first photoelectric converter 109 during the exposure/accumulation operation period is transferred to floating diffusion 108 via first transfer transistor 101. Then, in floating diffusion 108, the transferred signal charge is converted to a voltage signal at the HCG.

Then, at time t14, drive signal TG falls. First transfer transistor 101 enters the nonconductive state as a result.

On the other hand, the pixel signal output from amplifying transistor 105 at time t14 is AD-converted as an HCG pixel signal.

At this point, the AD conversion and CDS processing of the HCG pixel signal ends. The LCG reset pixel signal temporarily held in sample holder 11 is then AD-converted.

Then, at time t15, drive signal GC rises. Third transfer transistor 104 enters the conductive state as a result. The conversion gain of floating diffusion 108 switches to the LCG as a result.

Then, at time t16, drive signal TG rises. First transfer transistor 101 enters the conductive state as a result. Accordingly, the signal charge accumulated in first photoelectric converter 109 is transferred to floating diffusion 108 via first transfer transistor 101. Then, in floating diffusion 108, the transferred signal charge is converted to a voltage signal at the LCG.

Then, at time t17, drive signal TG falls. First transfer transistor 101 enters the nonconductive state as a result.

The sample holder in the later stage temporarily holds the pixel signal output from amplifying transistor 105 at time t17 as a LCG pixel signal.

Then, at time t18, drive signal TGC and drive signal PVDDSEL rise. Second transfer transistor 103 and switch transistor 107 enter the conductive state as a result. On the other hand, because third transfer transistor 104 remains in the conductive state, during the exposure/accumulation period, a signal charge accumulated in first charge accumulator 110, exceeding the potential barrier formed by overflow transistor 102, is transferred from first photoelectric converter 109 to floating diffusion 108 via third transfer transistor 104, and is added to the signal charge transferred previous thereto from first photoelectric converter 109.

Furthermore, at this time, once time t18 arrives, the potential of variable voltage PVDD changes from a predetermined set voltage lower than the potential of power supply line 200 to a power supply voltage at the same potential as the potential of power supply line 200. This sets the potential of the first other electrode of first charge accumulator 110 to the same potential as when first charge accumulator 110 is reset.

At this time, because PVDD line 202 that supplies variable voltage PVDD draws a charge from the first other electrode of first charge accumulator 110 of all pixels 3 in the readout row, due to the time constant of the wiring resistance and parasitic capacitance of PVDD line 202, it takes a certain length of time for the potential of PVDD line 202 to converge. However, because switch transistor 107 enters the conductive state at the same time, the power supply wiring network of pixel array 30 also draws a charge from the first other electrode of first charge accumulator 110 through power supply line 203, and thus the time required for the potential of PVDD line 202 to converge is significantly shorter than when drawing the charge of PVDD line 202 alone.

On the other hand, in parallel with this, when time t18 arrives, the LCG pixel signal temporarily held in sample holder 11 is AD-converted.

At this point, the AD conversion and CDS processing of the LCG pixel signal ends.

Note that during the period from time t18 to time t19, the conversion gain of floating diffusion 108 is the LCG, and the signal charge accumulated in first photoelectric converter 109 and the signal charge accumulated in first charge accumulator 110 are added in floating diffusion 108 and transferred. As such, the pixel signal output from amplifying transistor 105 has a relatively wide dynamic range. This pixel signal is temporarily held in sample holder 11, and the pixel signal is AD-converted during a reset signal readout period after time t19.

Then, at time t19, drive signal RS rises. Reset transistor 100 enters the conductive state as a result. On the other hand, both second transfer transistor 103 and third transfer transistor 104 remain in the conductive state, and first charge accumulator 110 is therefore reset.

At this time, the first one electrode and the first other electrode of first charge accumulator 110 are in a shorted state due to a short-circuit path traversing second transfer transistor 103, reset transistor 100, power supply line 200, power supply line 203, and switch transistor 107.

Accordingly, as indicated by the broken line arrow in FIG. 3, after being discharged from the first one electrode of first charge accumulator 110 to power supply line 200, most of the signal charge accumulated in first charge accumulator 110 flows to the first other electrode of first charge accumulator 110, not toward the exterior of pixel array 30 through the power supply wiring network of pixel array 30, which has a relatively high wiring resistance, but rather through the stated short-circuit path, which has a lower resistance.

In this manner, most of the current flowing when first charge accumulator 110 is reset does not flow toward the exterior of pixel array 30 through the power supply wiring network provided in pixel array 30, but rather through the stated short-circuit path, which is formed in a local region near the corresponding pixel 3.

Accordingly, even if first charge accumulator 110 has a large capacity, the amount by which the voltage drops in the power supply wiring network in pixel array 30 is suppressed by the discharge of the charge accumulated in first charge accumulator 110 when first charge accumulator 110 is reset. The same applies when the number of pixels 3 constituting pixel array 30 is increased greatly.

This makes it possible to suppress an increase in the time required for the voltage drop in the power supply wiring network within pixel array 30 to converge after first charge accumulator 110 is reset.

Then, at time t20, drive signal RS falls. Reset transistor 100 enters the nonconductive state as a result. At this time, the conversion gain of floating diffusion 108 is the LCG.

The sample holder in the later stage temporarily holds the pixel signal output from amplifying transistor 105 at time t20 as a LCG reset pixel signal.

Then, at time t21, drive signal TGC and drive signal PVDDSEL fall. Second transfer transistor 103 and switch transistor 107 enter the nonconductive state as a result.

Furthermore, at this time, once time t21 arrives, the potential of variable voltage PVDD changes from the power supply voltage at the same potential as that of power supply line 200, to the predetermined set voltage lower than the potential of power supply line 200.

Then, at time t22, drive signal GC falls. Third transfer transistor 104 enters the nonconductive state as a result. The conversion gain of floating diffusion 108 switches to the HCG as a result.

On the other hand, in parallel with this, when time t22 arrives, the LCG reset pixel signal temporarily held in sample holder 11 is AD-converted.

At this point, the AD conversion and CDS processing on the signal obtained by the LCG pixel signal and the signal charge accumulated in first charge accumulator 110 being added ends.

Furthermore, at this time, when time t22 arrives, drive signal SEL falls. Selection transistor 106 enters the nonconductive state as a result.

The series of readout processing ends upon selection transistor 106 entering the nonconductive state.

Then, when horizontal synchronization signal HS falls, the readout processing of the next row, or the next plurality of rows, is started again.

Embodiment 2

A solid-state image capturing device according to Embodiment 2, configured by changing part of the configuration of solid-state image capturing device 1 according to Embodiment 1, will be described next.

Solid-state image capturing device 1 is an example of a configuration in which pixel array 30 is constituted by pixels 3 which are all the same.

On the other hand, the solid-state image capturing device according to Embodiment 2 is an example in which the pixel array according to Embodiment 2 is configured such that in each row, pixels 3 and pixels according to Embodiment 2 are disposed in an alternating manner.

Components in the solid-state image capturing device according to Embodiment 2 that are the same as those of solid-state image capturing device 1 will be given the same reference signs as those already described, and detailed descriptions thereof will be omitted, with the descriptions focusing on the differences from solid-state image capturing device 1.

Figure 6:
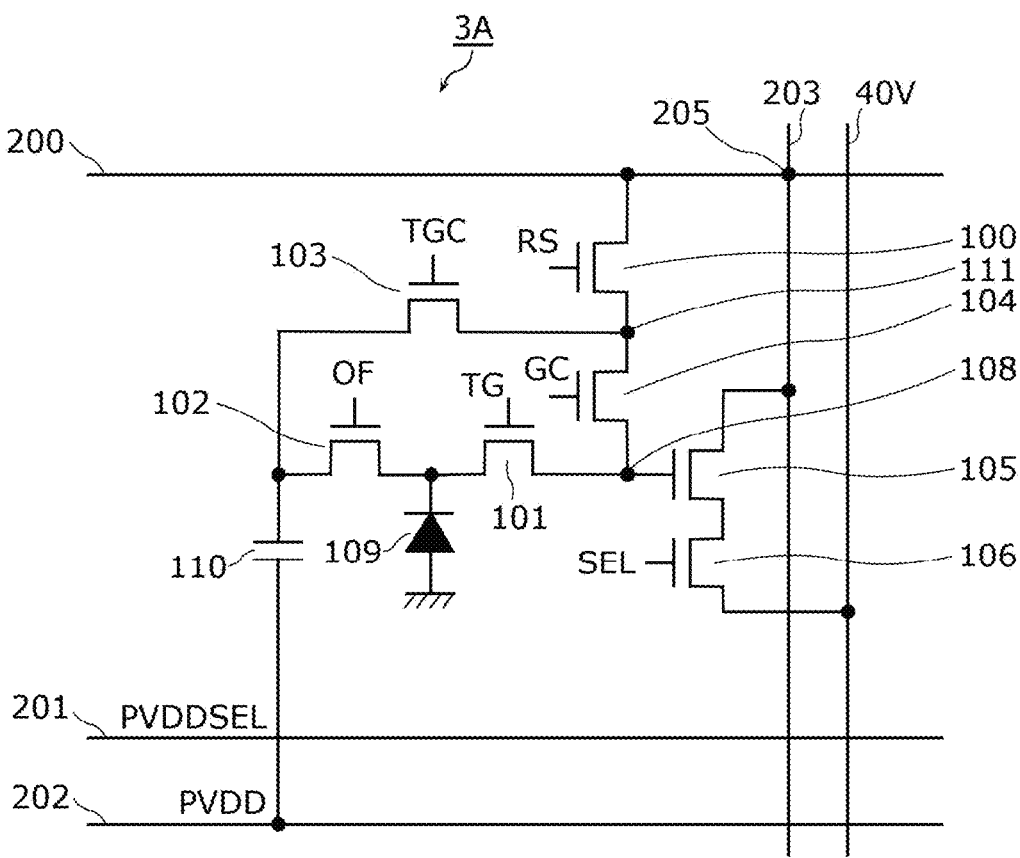
FIG. 6 is a circuit diagram illustrating the configuration of a pixel according to Embodiment 2.
Figure 7:
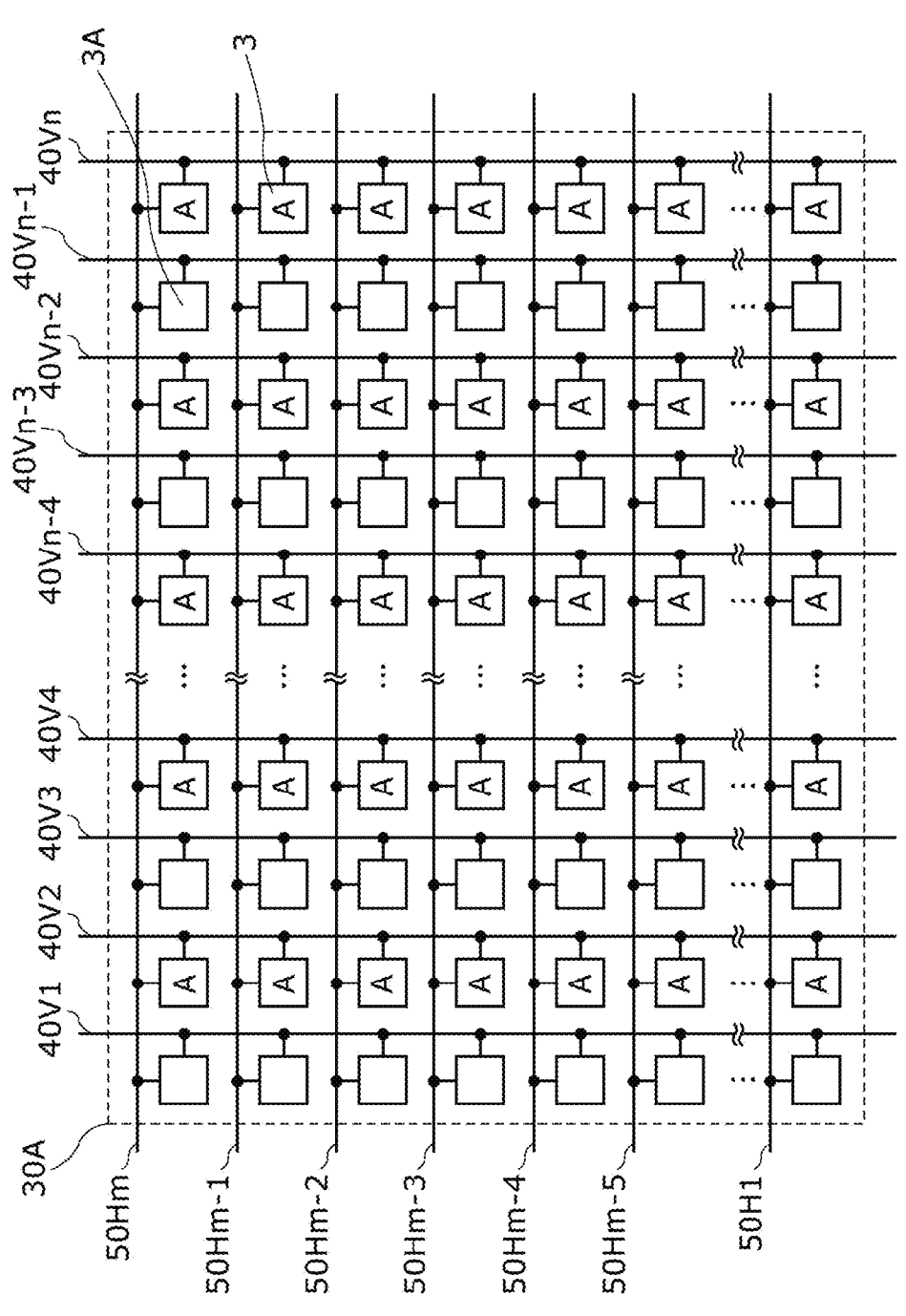
FIG. 7 is a schematic diagram illustrating the configuration of a pixel array according to Embodiment 2.

FIG. 6 is a circuit diagram illustrating the configuration of pixel 3A according to Embodiment 2, and FIG. 7 is a schematic diagram illustrating the configuration of pixel array 30A according to Embodiment 2.

As illustrated in FIG. 6, pixel 3A is configured by removing switch transistor 107 from pixel 3 according to Embodiment 1.

As illustrated in FIG. 7, pixel array 30A is configured with pixel 53 and pixel 3A disposed in an alternating manner in each row.

In pixel array 30A having the stated configuration, when resetting first charge accumulator 110 of pixel 3 and pixel 3A in each row, (1) when resetting first charge accumulator 110 of pixel 3, most of the signal charge accumulated in first charge accumulator 110 is discharged by current flowing in a short-circuit path, formed via switch transistor 107 of that pixel 3, that shorts the first one electrode and the first other electrode of first charge accumulator 110 of that pixel 3, as described above, but (2) when resetting first charge accumulator 110 of pixel 3A, most of the signal charge accumulated in first charge accumulator 110 is discharged by current flowing in a short-circuit path, formed via switch transistor 107 of pixel 3 located in the vicinity of that pixel 3A, that shorts the first one electrode and the first other electrode of first charge accumulator 110 of that pixel 3A.

Accordingly, the amount by which the voltage drops in the power supply wiring network within pixel array 30, due to the discharge of the charge accumulated in first charge accumulators 110 when first charge accumulators 110 of pixel 3 and pixel 3A are reset, is suppressed.

As illustrated in FIG. 7, the number of pixels 3 in each row of pixel array 30A is half the number of pixels in each row of pixel array 30 according to Embodiment 1. In other words, the number of switch transistors 107 is halved.

Accordingly, the amount of current flowing to switch transistors 107 when first charge accumulator 110 is reset in pixel array 30A is twice the amount of current described above with reference to pixel array 30. This makes the time required for the voltage drop in the power supply wiring network to converge in pixel array 30A longer than the time required for the voltage drop to 35 converge in pixel array 30. On the other hand, because the number of switch transistors 107 is halved, there is an advantage that the size of first photoelectric converters 109 of pixel 3 and pixel 3A in pixel array 30A can be made larger than the size thereof in pixel array 30.

Although pixel array 30A is described here as having pixel 3 and pixel 3A disposed in an alternating manner in each row, it is not absolutely necessary for pixel 3 and pixel 3A to be disposed in an alternating manner, as long as the configuration is such that pixel 3 and pixel 3A are disposed in a regular manner in each row.

For example, pixel array 30A may be configured with pixel 3A disposed in a regular manner at a pitch of at least two pixels in each row. In this case, the pitch at which pixels 3A are disposed may be determined according to, for example, a tradeoff between the time it takes for the voltage drop in the power supply wiring network to converge in and the size of first photoelectric converter 109 in pixel array 30A.

Additionally, it is necessary for at least one switch transistor 107 to be disposed in each readout row in pixel array 30A. At that time, it is necessary to make the responsiveness and fluctuations of the readout operations uniform among the readout rows, and it is therefore desirable to make the number of pixels 3 disposed per readout row the same for all readout rows.

Variation 1

A solid-state image capturing device according to Variation 1, configured by changing part of the configuration of solid-state image capturing device according to Embodiment 2, will be described next.

The solid-state image capturing device according to Embodiment 2 is an example of a configuration in which pixel array 30A is constituted by pixels 3 and pixels 3A.

As opposed to this, the solid-state image capturing device according to Variation 1 is an example of a configuration in which each of pixels 3 and pixels 3A constituting the pixel array according to Variation 1 is irradiated with light transmitted through a color filter.

Components in the solid-state image capturing device according to Variation 1 that are the same as those of the solid-state image capturing device according to Embodiment 2 will be given the same reference signs as those already described, and detailed descriptions thereof will be omitted, with the descriptions focusing on the differences from the solid-state image capturing device according to Embodiment 2.

Figure 8:
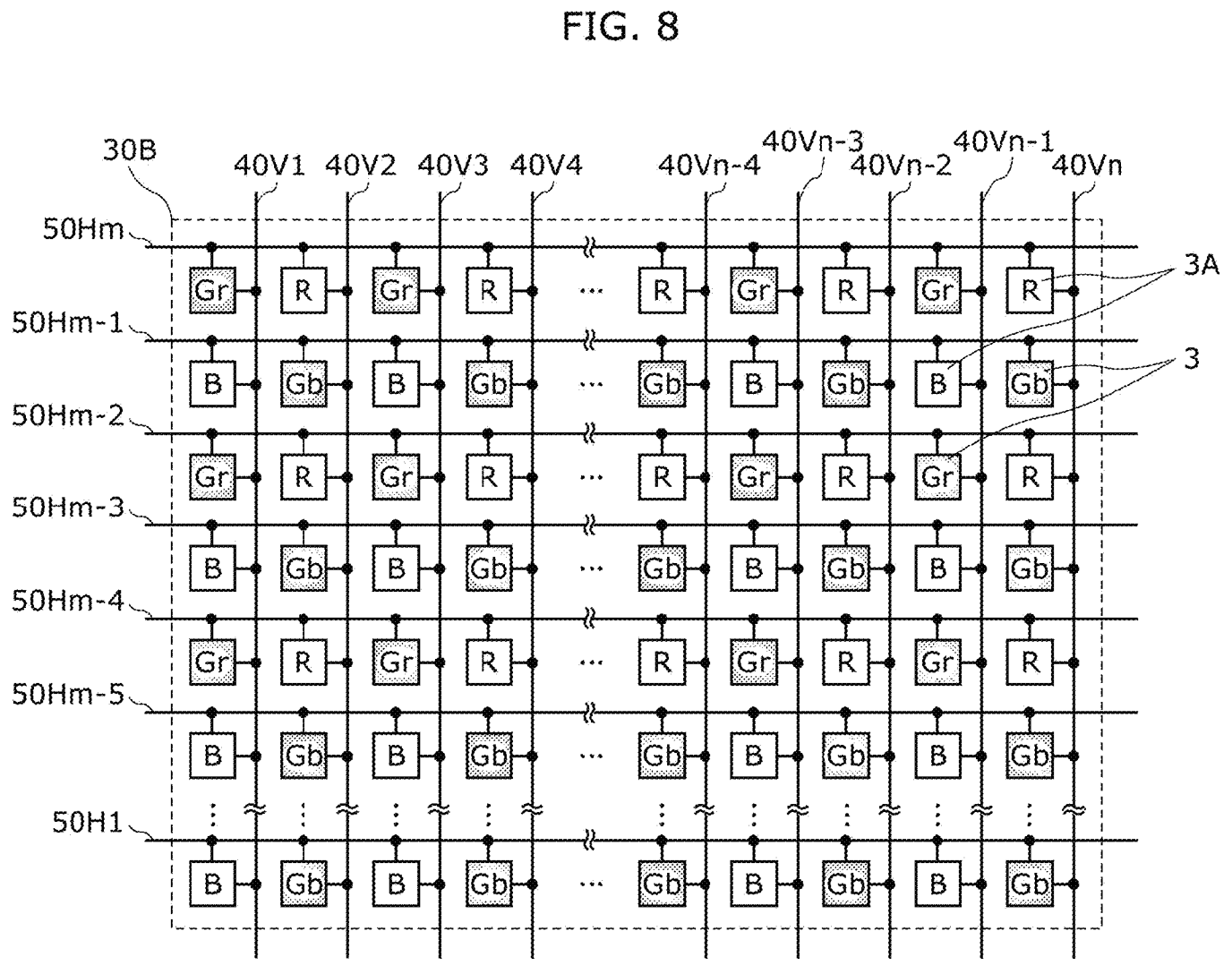

FIG. 8 is a schematic diagram illustrating the configuration of pixel array 30B according to Variation 1.

As illustrated in FIG. 8, like pixel array 30A according to Embodiment 2, pixel array 30B is configured with pixel 3 and pixel 3A disposed in an alternating manner in each row. Pixels 3 and pixels 3A constituting pixel array 30B are irradiated with light transmitted through color filters which are provided in a Bayer array and that filter light transmitted therethrough.

More specifically, pixel array 30B is constituted by pixel rows in which pixels 3 irradiated with Gr (green) light and pixels 3A irradiated with R (red) light are disposed, and pixel rows in which pixels 3A irradiated with B (blue) light and pixels 3A irradiated with Gb (green) light are disposed, the pixel rows being disposed in an alternating manner. As a result of this configuration, in pixel array 30B, the relative positional relationships between each pixel 3A and pixel 3 located closest to that pixel 3A are equal in pixel array 30B.

Since Gr and Gb are the same color, it is desirable that the sensitivity and saturation characteristics of pixels irradiated with Gr light and pixels irradiated with Gb light be the same. Accordingly, it is desirable that the relative positional relationship between first photoelectric converter 109 and a diffusion layer of switch transistor 107 in these pixels be arranged to maintain symmetry between any pixels irradiated with light of the same color in pixel array 30B. Accordingly, as illustrated in FIG. 8, pixel array 30B may be configured with pixel 3 at a location irradiated with Gr light and Gb light, and pixel 3A at a location irradiated with R light and B light.

Alternatively, pixel 3A may be configured at a location irradiated with Gr light and Gb light, and pixel 3 at a location irradiated with R light and B light. In this configuration, R and B are different colors, but in white balance processing performed in a later stage, gain correction is performed on the pixel irradiated with each color based on pixel 3 irradiated with Gr light and pixel 3 irradiated with Gb light. Correction including the differences in characteristics between each color is therefore performed, and there is therefore no problem.

For similar reasons, the configuration may be such that only the pixel at a location irradiated with R light or the pixel at a location irradiated with B light is taken as pixel 3. However, in this configuration, it is necessary to configure pixel array 30B with the pixel irradiated with Gr light and the pixel irradiated with Gb light as pixels 3, to ensure there are no readout rows in pixel array 30B in which switch transistor 107 is not provided. However, in this configuration, the number of switch transistors 107 disposed differs from row to row in pixel array 30B, which results in set differences between the responsiveness and fluctuations of the readout operations among the rows. It is therefore necessary to permit the solid-state image capturing device according to Variation 1 to be affected by these set differences when adopting such a configuration.

Note that switch transistor 107 does not absolutely have to be provided within pixel 3 in pixel array 30B.

The configuration may be such that switch transistors 107 satisfy the stated regularity of the pixel arrangement, e.g., all pixels 3A in pixel array 30B may be pixels 3A, and switch transistors 107 may be disposed symmetrically at a boundary position of pixel 3A at an equal distance from first photoelectric converters 109 of two adjacent pixels 3A.

Variation 2

A solid-state image capturing device according to Variation 2, configured by changing part of the configuration of the solid-state image capturing device according to Variation 1, will be described next.

The solid-state image capturing device according to Variation 1 is an example of a configuration in which pixels 3 and pixels 3A constituting pixel array 30B are irradiated with light transmitted through a Bayer array color filter.

As opposed to this, the solid-state image capturing device according to Variation 2 is an example of a configuration in which each of pixels 3 and pixels 3A constituting the solid-state image capturing device according to Variation 2 is irradiated with light transmitted through an RGBW color filter.

Components in the solid-state image capturing device according to Variation 2 that are the same as those of the solid-state image capturing device according to Variation 1 will be given the same reference signs as those already described, and detailed descriptions thereof will be omitted, with the descriptions focusing on the differences from the solid-state image capturing device according to Variation 1.

Figure 9:
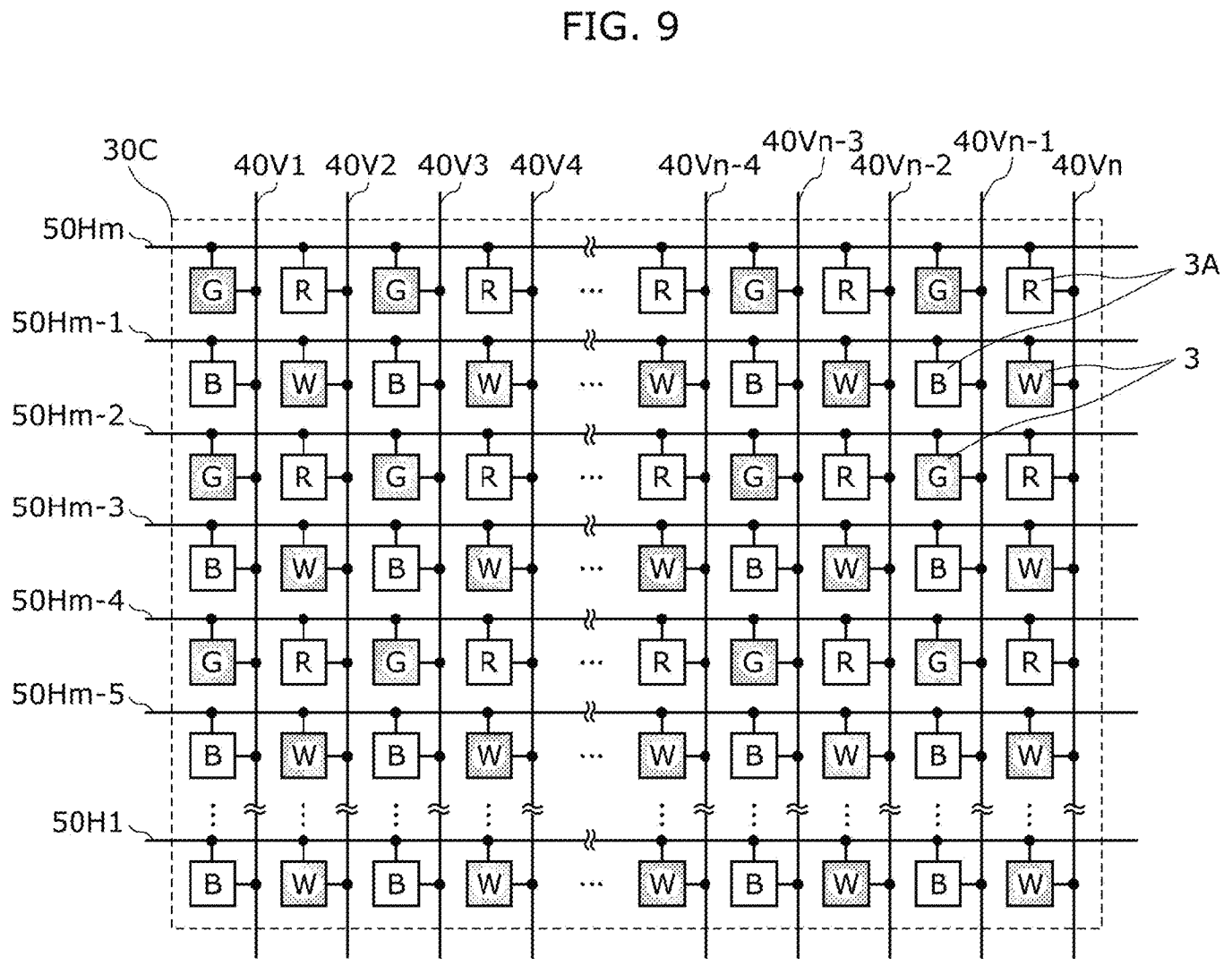

FIG. 9 is a schematic diagram illustrating the configuration of pixel array 30C according to Variation 2.

As illustrated in FIG. 9, like pixel array 30B according to Variation 1, pixel array 30C is configured with pixel 3 and pixel 3A disposed in an alternating manner in each row. Pixels 3 and pixels 3A constituting pixel array 30C are irradiated with light transmitted through color filters which are provided in an RGBW array and that filter light transmitted therethrough.

More specifically, pixel array 30C is constituted by pixel rows in which pixels 3 irradiated with G (green) light and pixels 3A irradiated with R light are disposed, and pixel rows in which pixels 3 irradiated with W (white) light and pixels 3A irradiated with B light are disposed, the pixel rows being disposed in an alternating manner. As a result of this configuration, in pixel array 30C, the relative positional relationships between each pixel 3A and pixel 3 located closest to that pixel 3A are equal in pixel array 30C.

This pixel arrangement in pixel array 30C is a pixel arrangement in which pixels 3 and pixel 3A are disposed such that pixels irradiated with light of the same color are pixels of the same type of pixels (here, pixels 3 or pixels 3A) between groups of pixels constituting units of the filter arrangement (here, units of two rows and two columns), and at least one switch transistor 107 is present in each unit of readout rows.

Although a case where the unit in which the color filters are arranged is a unit of two rows and two columns is described here, it is not necessary to limit the unit in which the color filters are arranged to a unit of two rows and two columns. The unit in which the color filters are arranged arrangement unit may be any such unit as long as the pixel arrangement described above can be realized.

Embodiment 3

A solid-state image capturing device according to Embodiment 3, configured by changing part of the configuration of solid-state image capturing device 1 according to Embodiment 1, will be described next.

The solid-state image capturing device according to Embodiment 3 is an example in which a part of the configuration of pixel 3 has been changed from that in solid-state image capturing device 1, and furthermore, a part of the configuration of the power supply wiring network in pixel array 30 has been changed.

Components in the solid-state image capturing device according to Embodiment 3 that are the same as those of solid-state image capturing device 1 will be given the same reference signs as those already described, and detailed descriptions thereof will be omitted, with the descriptions focusing on the differences from solid-state image capturing device 1.

Figure 10:
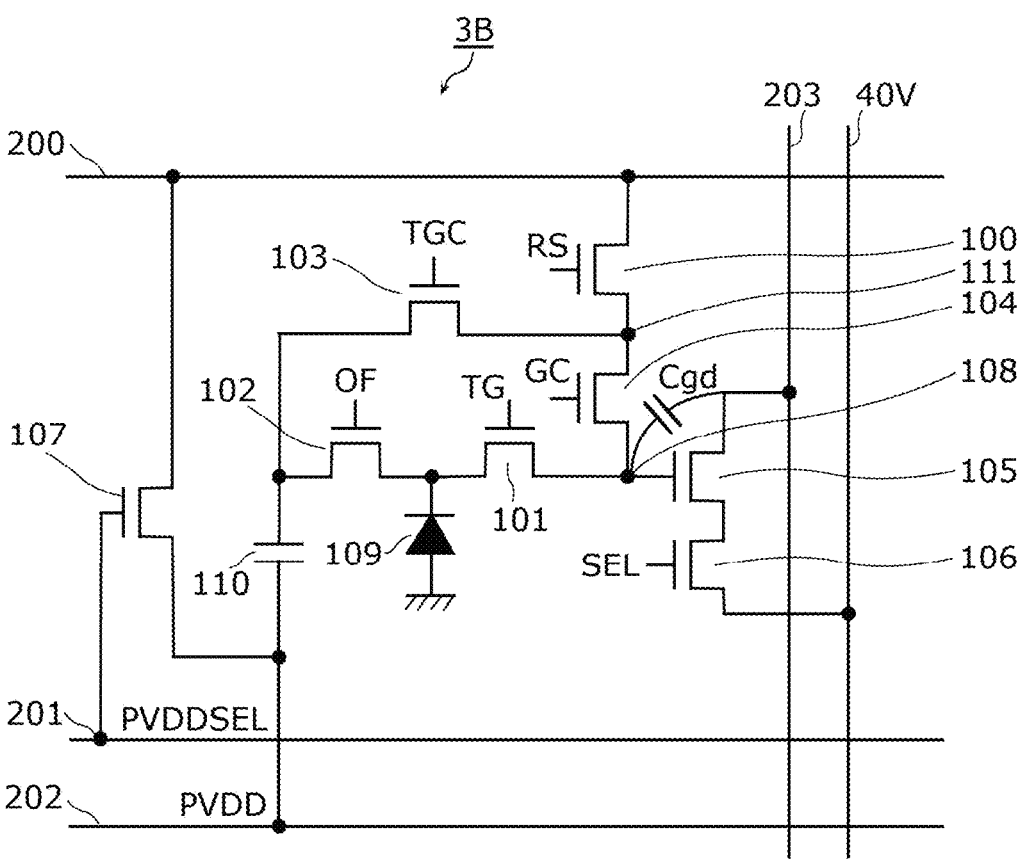
FIG. 10 is a circuit diagram illustrating the configuration of a pixel according to Embodiment 3.

FIG. 10 is a circuit diagram illustrating the configuration of pixel 3B according to Embodiment 3.

As illustrated in FIG. 10, pixel 3B is configured by changing pixel 3 according to Embodiment 1 such that the other of the source or the drain of switch transistor 107 is connected to power supply line 200 extending horizontally for each row of pixels in pixel array.

Additionally, as illustrated in FIG. 10, in the pixel array according to Embodiment 3, power supply line 200 extending horizontally for each row of pixels and power supply line 203 extending vertically for each row of pixels are not connected to each other. In other words, the power supply wiring network in the pixel array according to Embodiment 3 is configured such that each power supply line 200 extending horizontally for each row of pixels and each power supply line 203 extending vertically for each row of pixels are not connected to each other.

In contrast, as illustrated in FIG. 2, in pixel array 30 according to Embodiment 1, power supply line 200 extending horizontally for each row of pixels and power supply line 203 extending vertically for each row of pixels are connected at intersection point 205 near each pixel 3. In other words, the power supply wiring network in pixel array 30 is configured such that each power supply line 200 extending horizontally for each row of pixels and each power supply line 203 extending vertically for each row of pixels are connected to each other.

In pixel array 30 and the pixel array according to Embodiment 3, the drain of amplifying transistor 105 in pixel 3 and pixel 3B is connected, by power supply line 203, to the drain of the amplifying transistor in pixel 3 or pixel 3B in the same row.

On the other hand, the gate of amplifying transistor 105 in pixel 3 and pixel 3B is connected to floating diffusion 108 in the same pixel 3 or pixel 3B. Parasitic capacitance Cgd arises across the gate and drain of amplifying transistor 105 in pixel 3 and pixel 3B.

As described above, when resetting first charge accumulator 110 in pixel array 30, current flows in a short-circuit path that shorts the first one electrode and the first other electrode of first charge accumulator 110, and that traverses second transfer transistor 103, reset transistor 100, power supply line 200, power supply line 203, and switch transistor 107. The potential of power supply line 203 therefore fluctuates.

In addition, during the period when first charge accumulator 110 is being reset, readout operations are performed in parallel therewith in other rows.

When the potential of power supply line 203 fluctuates in pixels 3 in the row where readout operations are being performed, parasitic capacitance Cgd across the gate and drain of amplifying transistor 105 injects a charge into floating diffusion 108. The charge injected into floating diffusion 108 produces noise in the pixel signal output from pixel 3.

In contrast, in the pixel array according to Embodiment 3, power supply line 200 and power supply line 203 are not connected, and thus when resetting first charge accumulator 110, power supply line 203 is not included in the short-circuit path that short-circuits the first one electrode and the first other electrode of first charge accumulator 110. Accordingly, fluctuations in the potential of power supply line 203 when first charge accumulator 110 is reset are suppressed.

Accordingly, in the pixel array according to Embodiment 3, noise in the pixel signal output from pixel 3B is suppressed.

Note that outside the pixel array according to Embodiment 3, the power supply that supplies the power supply voltage to power supply line 200 and the power supply that supplies power supply voltage to power supply line 203 may be the same, or may be different from each other.

If the power supplies are the same, outside the pixel array according to Embodiment 3, power supply line 200 and power supply line 203 may be connected with high resistance and stabilized by a decoupling capacitor or the like.

Embodiment 4

A solid-state image capturing device according to Embodiment 4, configured by changing part of the configuration of solid-state image capturing device 1 according to Embodiment 1, will be described next.

The solid-state image capturing device according to Embodiment 4 is an example in which solid-state image capturing device 1 has been changed, such that two pixels 3 adjacent to each other in the same column in pixel array 30 are merged into a single pixel that shares floating diffusion 108.

Components in the solid-state image capturing device according to Embodiment 4 that are the same as those of solid-state image capturing device 1 will be given the same reference signs as those already described, and detailed descriptions thereof will be omitted, with the descriptions focusing on the differences from solid-state image capturing device 1.

Figure 11:
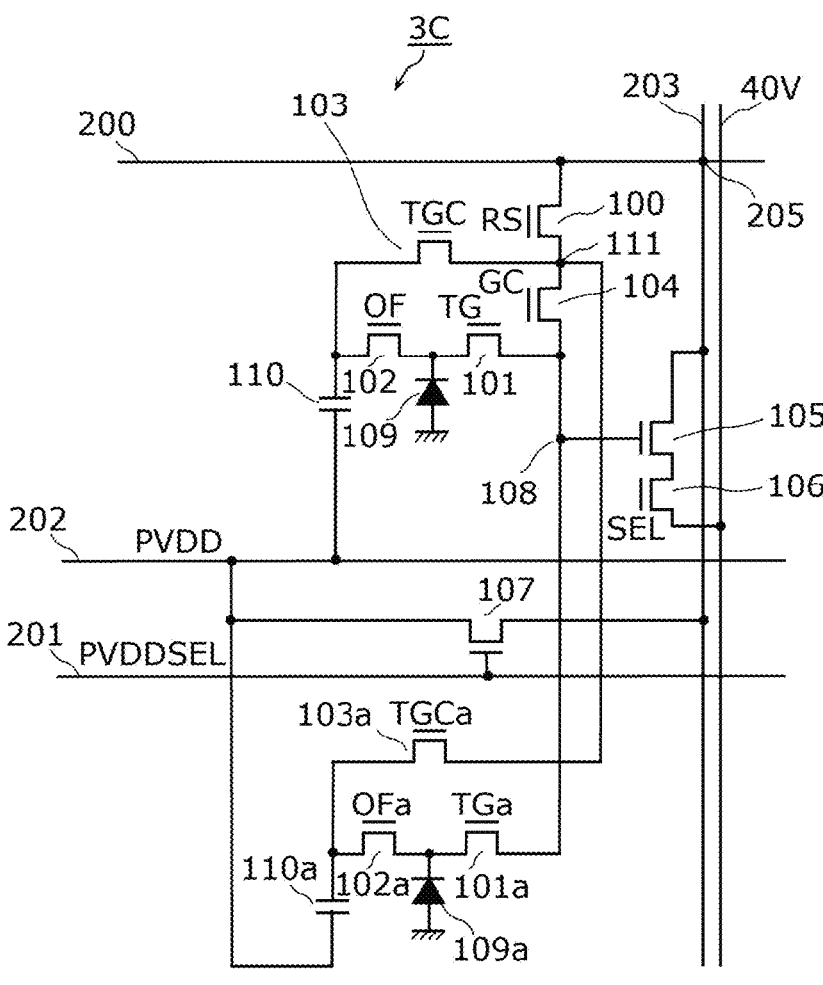
FIG. 11 is a circuit diagram illustrating the configuration of a pixel according to Embodiment 4.

FIG. 11 is a circuit diagram illustrating the configuration of pixel 3C according to Embodiment 4.

Figure 12:
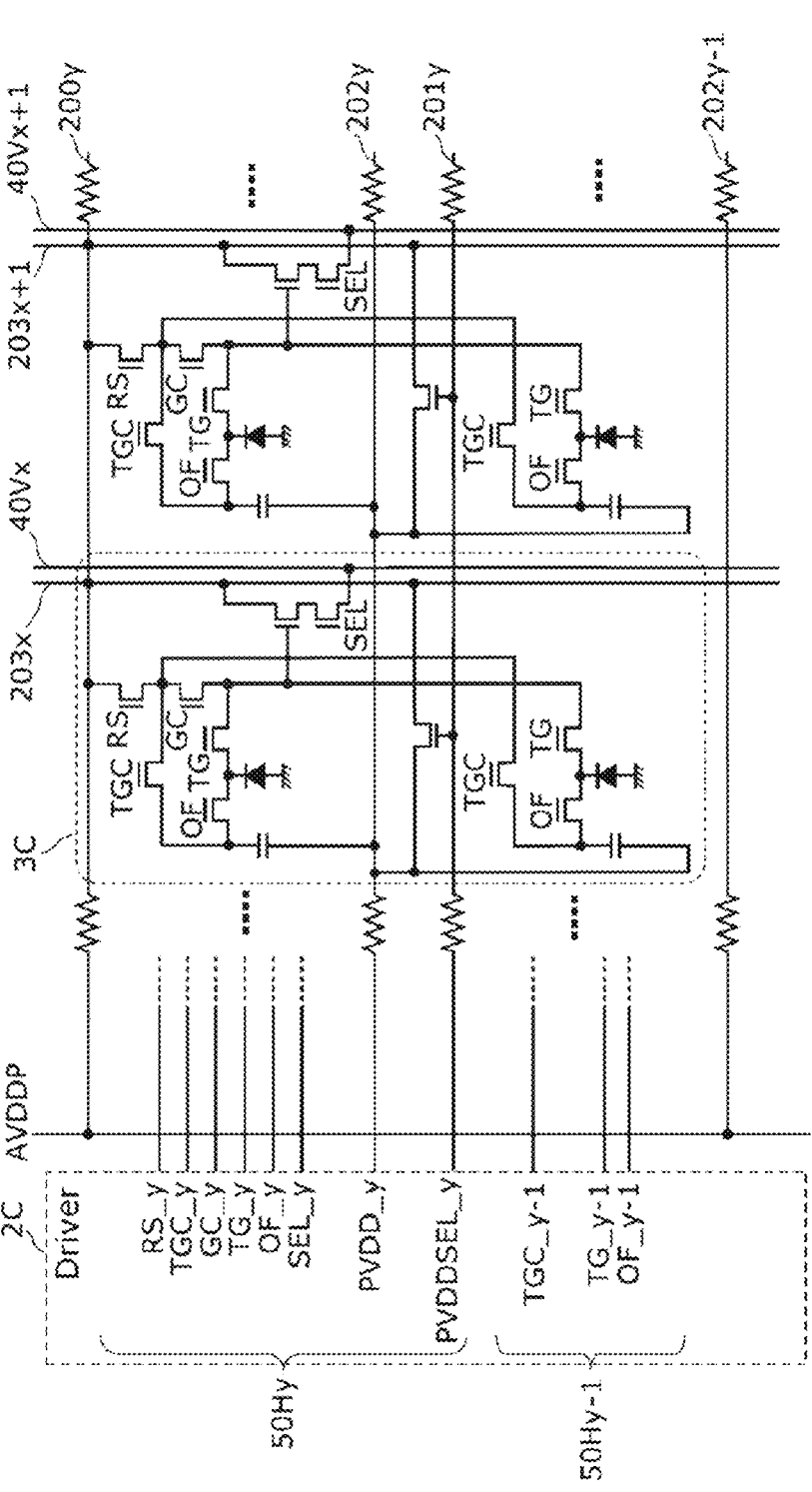
FIG. 12 is a circuit diagram illustrating the circuit configuration in the vicinity of a pixel located in row y and column x in a pixel array according to Embodiment 4.

FIG. 12 is a circuit diagram illustrating the circuit configuration in the vicinity of pixel 3C located in row y and column x in a pixel array according to Embodiment 4.

As illustrated in FIGS. 11 and 12, pixel 3C is configured such that two pixels 3 adjacent to each other in the same column in pixel array 30 share floating diffusion 108, potential part 111, reset transistor 100, third transfer transistor 104, amplifying transistor 105, and selection transistor 106.

More specifically, pixel 3C is configured by adding second photoelectric converter 109a, second charge accumulator 110a, fourth transfer transistor 101a, fifth transfer transistor 103a, and overflow transistor 102a to pixel 3, as illustrated in FIG. 11.

Second photoelectric converter 109a is similar to first photoelectric converter 109. Second photoelectric converter 109a converts received light into a signal charge. In other words, second photoelectric converter 109a generates a signal charge based on an amount of light received, and accumulates the generated signal charge.

Second photoelectric converter 109a is implemented by a photodiode having a PN junction, for example, similar to first photoelectric converter 109.

Second charge accumulator 110a is similar to first charge accumulator 110. Second charge accumulator 110a is constituted by a capacitor which has a second one electrode and a second other electrode, is for accumulating a signal charge generated by second photoelectric converter 109a in the second one electrode, and in which the second one electrode is connected to second photoelectric converter 109a.

In the example of the configuration of pixel 3C illustrated in FIG. 11, the second one electrode of second charge accumulator 110a is connected to second photoelectric converter 109a by overflow transistor 102a.

Like first charge accumulator 110, second charge accumulator 110a is implemented by a high-density voltage domain capacitor between metal wiring layers (e.g., a MIM capacitor) formed on the surface of the semiconductor substrate on which pixels 3C are formed, for example, on the surface opposite from a light-receiving surface on which second photoelectric converter 109a is formed.

Variable voltage PVDD is supplied from driver 2 to the second other electrode of second charge accumulator 110a.

Fourth transfer transistor 101a is similar to first transfer transistor 101. Fourth transfer transistor 101a has a source and a drain, one of which is connected to second photoelectric converter 109a and the other of which is connected to floating diffusion 108.

Fourth transfer transistor 101a is an NMOS transistor, and drive signal TGa is applied to the gate thereof. Accordingly, fourth transfer transistor 101a enters a nonconductive state when drive signal TGa goes to logic level LOW, and enters a conductive state when drive signal TGa goes to logic level HIGH.

When fourth transfer transistor 101a enters the conductive state, the signal charge accumulated in second photoelectric converter 109a is transferred to floating diffusion 108 through fourth transfer transistor 101a.

Fifth transfer transistor 103a is similar to second transfer transistor 103. Fifth transfer transistor 103a has a source and a drain, one of which is connected to the second one electrode of second charge accumulator 110a and the other of which is connected to potential part 111.

Fifth transfer transistor 103a is an NMOS transistor, and drive signal TGCa is applied to the gate thereof. Accordingly, fifth transfer transistor 103a enters a nonconductive state when drive signal TGCa goes to logic level LOW, and enters a conductive state when drive signal TGCa goes to logic level HIGH.

When fifth transfer transistor 103a enters the conductive state, the potential of the second one electrode of second charge accumulator 110a and the potential of potential part 111 are coupled.

Overflow transistor 102a is similar to overflow transistor 102. Overflow transistor 102a has a source and a drain, one of which is connected to second photoelectric converter 109a and the other of which is connected to the second one electrode of second charge accumulator 110a.

Overflow transistor 102a is an NMOS transistor, and drive signal OFa is applied to the gate thereof.

Accordingly, by controlling drive signal OFa, the height of a potential barrier between second photoelectric converter 109a and the second one electrode of second charge accumulator 110a can be controlled.

Of the signal charges generated by second photoelectric converter 109a, a signal charge having a potential exceeding the stated potential barrier is transferred from second photoelectric converter 109a to second charge accumulator 110a.

An example is also conceivable in which pixel 3C does not include overflow transistor 102a, and second photoelectric converter 109a and the second one electrode of second charge accumulator 110a are directly connected. In this configuration example, the height of the potential barrier between second photoelectric converter 109a and the second one electrode of second charge accumulator 110a is fixed.

As described above, pixel 3C having this configuration is configured such that floating diffusion 108, potential part 111, reset transistor 100, third transfer transistor 104, amplifying transistor 105, and selection transistor 106 have been removed from a configuration constituted by two pixels 3. Accordingly, the size of first photoelectric converter 109 and second photoelectric converter 109a in pixel 3C can be increased beyond the size of first photoelectric converter 109 in pixel 3C by an amount corresponding to the stated components that have been removed.

The exposure start processing and readout processing performed by the solid-state image capturing device according to Embodiment 4 are similar to the exposure start processing and readout processing performed by the solid-state image capturing device described in Embodiment 1, and will therefore not be described in detail. However, drive signal RS, drive signal GC, drive signal SEL, drive signal PVDDSEL, and variable voltage PVDD repeat the same operations in the exposure start processing and readout processing over the scanning periods for two adjacent rows, whereas drive signal TCC, drive signal TGCa, drive signal TG, drive signal TGa, drive signal OF, and drive signal OFa repeat the same operations in the exposure start processing and readout processing on a row-by-row basis.

As can be seen from FIGS. 12 and 3, in the pixel array according to Embodiment 4, the number of drive signals driving pixels in row y−1 is reduced by half with respect to pixel array 30. Furthermore, drive signal PVDDSEL in row y−1 is no longer required, and PVDD line 202 in row y−1 is no longer required.

In this manner, in the pixel array according to Embodiment 4, the horizontally-extending wires are less dense than in pixel array 30.

Embodiment 5

An example of the configuration of driver 2 according to Embodiments 1 to 3 and Variations 1 and 2 will be described hereinafter.

In describing driver 2, the constituent elements appearing in Embodiments 1 to 3 and Variations 1 and 2 will be given the same reference signs, and detailed descriptions thereof will be omitted.

Although the following will describe driver 2 as being included in solid-state image capturing device 1 according to Embodiment 1 for the sake of convenience, the same applies to the solid-state image capturing devices according to other Embodiments and Variations.

As described above, driver 2 outputs variable voltage PVDD for each row of pixel array 30.

Figure 13A:
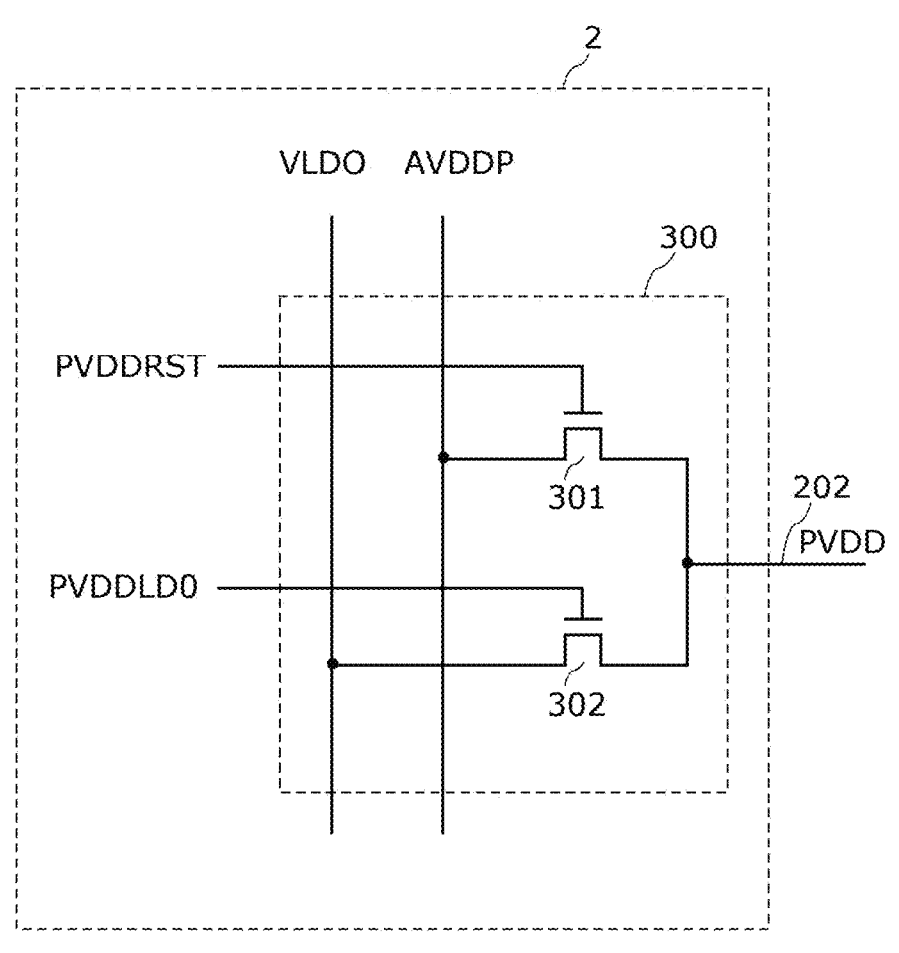
FIG. 13A is a block diagram illustrating a state in which a driver according to Embodiment 5 is provided with a variable voltage supply according to Embodiment 5.

FIG. 13A is a block diagram illustrating a state in which driver 2 is provided with variable voltage supply 300 outputting variable voltage PVDD for each row of pixel array 30.

As illustrated in FIG. 13A, driver 2 includes the same number of variable voltage supplies 300 as there are rows in pixel array 30, so as to correspond to each of the rows in pixel array 30.

Variable voltage supply 300 exclusively selects one of (i) voltage AVDDP at the same potential as the potential of power supply line 200, supplied from the same voltage supply as the voltage supply supplying the voltage to power supply line 200 (a first voltage) or (ii) voltage VLDO at a different potential from the potential of power supply line 200, supplied from a low-dropout regulator (LDO; not shown) (a second voltage), and outputs the voltage to the first other electrode of first charge accumulator 110 in each pixel 3 disposed in the corresponding column via PVDD line 202.

Here, voltage VLDO (the second voltage) is a predetermined set voltage lower than the potential of voltage AVDDP (the first voltage), and is set in advance to lower the potential during the exposure period of first charge accumulator 110.

Transistor 301 has a source and a drain, one of which is connected to a power source line that supplies voltage AVDDP, and the other of which is connected to PVDD line 202.

Transistor 301 is a high-breakdown voltage NMOS transistor, and drive signal PVDDRST output from timing controller 5 is applied to the gate thereof.

Accordingly, transistor 301 enters a nonconductive state when drive signal PVDDRST goes to logic level LOW, and enters a conductive state when drive signal PVDDRST goes to logic level HIGH.

When transistor 301 enters the conductive state, variable voltage supply 300 outputs voltage AVDDP to PVDD line 202.

Transistor 302 has a source and a drain, one of which is connected to a power source line that supplies voltage VLDO, and the other of which is connected to PVDD line 202.

Transistor 302 is a high-breakdown voltage NMOS transistor, and drive signal PVDDLDO output from timing controller 5 is applied to the gate thereof.

Accordingly, transistor 302 enters a nonconductive state when drive signal PVDDLDO goes to logic level LOW, and enters a conductive state when drive signal PVDDLDO goes to logic level HIGH.

When transistor 302 enters the conductive state, variable voltage supply 300 outputs voltage VLDO to PVDD line 202. Here, drive signal PVDDRST and drive signal PVDDLDO output from timing controller 5 are controlled by timing controller 5 to be mutually exclusive signals.

In addition, the potentials of logic level HIGH and logic level LOW of drive signal PVDDRST and drive signal PVDDLDO, respectively, are level-shifted, by a voltage signal supplied from a buck-boost power supply (not shown) within driver 2, to potentials at which voltage AVDDP and voltage VLDO can be output to or cut off from PVDD line 202.

Figure 13B:
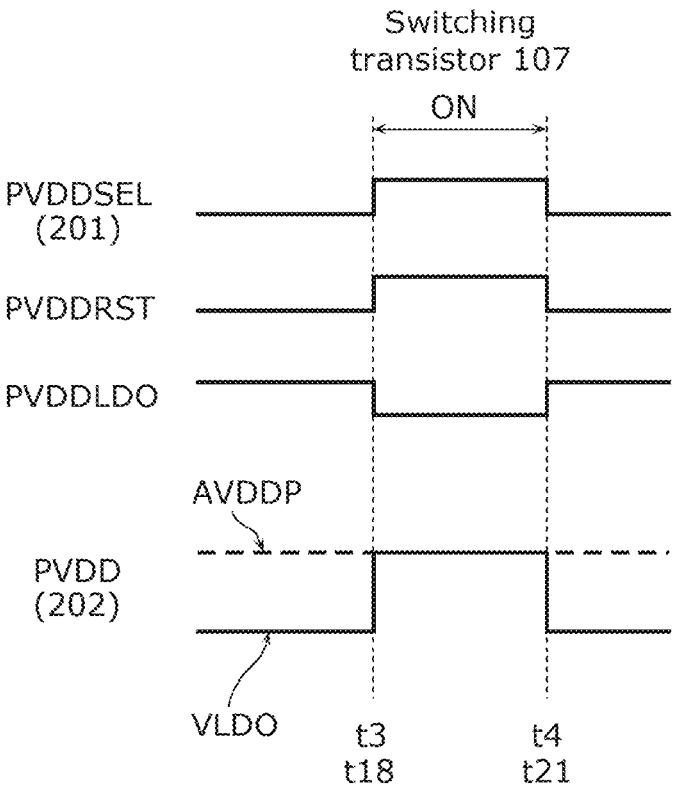
FIG. 13B is a timing chart illustrating a state in which the variable voltage supply outputs variable voltage PVDD according to Embodiment 5.

FIG. 13B is a timing chart illustrating a state in which variable voltage supply 300 outputs variable voltage PVDD.

In FIG. 13B, time t3 and time t4 denoted on the horizontal axis indicate times similar to time t3 and time t4 in the timing chart for the exposure start processing illustrated in FIG. 4, and time t18 and time t21 indicate times similar to time t18 and time t21 in the timing chart for the readout processing illustrated in FIG. 5.

The time before time t3 or time t18 is the exposure accumulation period of first charge accumulator 110.

As illustrated in FIG. 13B, during the exposure accumulation period of first charge accumulator 110 before time t3 or time t18, drive signal PVDDRST stays at logic level LOW, and drive signal PVDDLDO stays at logic level HIGH.

As a result, first transistor 301 enters the nonconductive state, and second transistor 302 enters the conductive state.

Accordingly, variable voltage supply 300 outputs a set voltage (here, voltage VLDO) lower than the potential of the voltage in the reset period or the readout period of pixel 3, to PVDD line 202.

Then, at time t3 or time t18, drive signal PVDDRST rises, and drive signal PVDDLDO falls.

As a result, first transistor 301 enters the conductive state, and second transistor 302 enters the nonconductive state.

Accordingly, variable voltage supply 300 switches the voltage output to PVDD line 202 from voltage VLDO to voltage AVDDP.

At this time, as described above, the voltage source that supplies the voltage to power supply line 200 and the voltage source that supplies the voltage to one of the source and the drain of transistor 301 are the same voltage source. As such, the potentials of both the source and the drain of switch transistor 107 match perfectly. Accordingly, after the potential of the first one electrode and the first other electrode of first charge accumulator 110 converge, not even a minute current flows between the source and the drain of switch transistor 107. This makes it possible to suppress an increase in power consumption in solid-state image capturing device 1, and furthermore makes it possible to suppress variations in the reset potentials among pixels 3.

Supplemental Descriptions

An example of the technique disclosed in the present application has been described based on Embodiments 1 to 5 and Variations 1 and 2. However, the present disclosure is not intended to be limited to these embodiments and variations. Variations on the present embodiment conceived by one skilled in the art, embodiments implemented by combining constituent elements from different other embodiments and variations, and the like may be included in the scope of one or more aspects of the present disclosure as well, as long as they do not depart from the essential spirit of the present disclosure.

(1) In the solid-state image capturing devices according to Embodiments 1 to 5 and Variations 1 and 2, driver 2 is not necessarily limited to a configuration that drives each pixel from one side in the horizontal direction of the pixel array according to Embodiments 1 to 5 and Variations 1 and 2. For example, driver 2 may be configured to drive each pixel of the pixel array from both sides in the horizontal direction of the pixel array.

(2) In the solid-state image capturing devices according to Embodiments 1 to 3 and Variations 1 and 2, the pixel according to Embodiments 1 to 3 and Variations 1 and 2 is described as including a single first photoelectric converter 109. However, the pixel according to Embodiments 1 to 3 and Variations 1 and 2 are not necessarily limited to a configuration including a single first photoelectric converter 109. For example, the pixel according to Embodiments 1 to 3 and Variations 1 and 2 may be configured including at least two first photoelectric converters 109.

(3) In the solid-state image capturing devices according to Embodiments 1 to 3 and Variations 1 and 2, the pixel according to Embodiments 1 to 3 and Variations 1 and 2 is described as including a single first charge accumulator 110. However, the pixel according to Embodiments 1 to 3 and Variations 1 and 2 are not necessarily limited to a configuration including a single first charge accumulator 110. For example, the pixel according to Embodiments 1 to 3 and Variations 1 and 2 may be configured including at least two first charge accumulators 110.

(4) In the solid-state image capturing devices according to Embodiments 1 to 5 and Variations 1 and 2, switch transistor 107 and first charge accumulator 110 may be disposed in a device region, and within a wiring layer thereof, on a front surface side of the back-illuminated substrate.

Alternatively, when the solid-state image capturing devices according to Embodiments 1 to 5 and Variations 1 and 2 are applied to a layered structure solid-state image capturing device, in which a semiconductor chip that forms first photoelectric converter 109, various transfer transistors, and the like and a semiconductor chip that forms readout circuitry, processing circuitry subsequent to AD conversion, and the like, are layered and bonded together, switch transistor 107 and first charge accumulator 110 may be formed on the latter semiconductor chip.

Doing so relaxes the constraints from the physical positional relationships between (i) first photoelectric converter 109 and (ii) switch transistor 107 and first charge accumulator 110. This makes it possible to expand the region for first photoelectric converter 109, and also makes it possible to reduce the on-resistance of switch transistor 107 by expanding the channel width of switch transistor 107.

INDUSTRIAL APPLICABILITY

The present disclosure can be widely used in solid-state image capturing devices and the like that capture images.

The invention claimed is:

1. A solid-state image capturing device comprising a pixel array in which a plurality of pixels including a first pixel are arranged in a matrix, wherein the first pixel includes:

a first photoelectric converter that converts received
light into a first signal charge;

a floating diffusion for accumulating the first signal
charge;

a first charge accumulator including a capacitor that
includes a first one electrode and a first other elec-
trode and that accumulates the first signal charge in
the first one electrode;

a first transfer transistor including a source and a drain,
one of which is connected to the first photoelectric
converter and an other of which is connected to the
floating diffusion;

a second transfer transistor including a source and a
drain, one of which is connected to the first one
electrode;

a reset transistor including a source and a drain, one of
which is connected to an other of the source or the
drain of the second transfer transistor, and an other of
which is connected to a first power supply line;

an amplifying transistor including a gate connected to
the floating diffusion;

a selection transistor including a drain connected to a
source of the amplifying transistor, and including a
source connected to a vertical signal line; and a switching transistor including a source and a drain,
one of which is connected to the first other electrode,
and an other of which is connected to the first power
supply line.

2. The solid-state image capturing device according to
claim 1, wherein each of the plurality of pixels is the first pixel.

3. The solid-state image capturing device according to
claim 1, wherein at least one of the plurality of pixels is a second
pixel different from the first pixel.

4. The solid-state image capturing device according to
claim 1, wherein the first pixel further includes an overflow tran-
sistor including a source and a drain, one of which is
connected to the first photoelectric converter and an
other of which is connected to the first one electrode,
and the first one electrode is connected to the first photoelec-
tric converter by the overflow transistor.

5. The solid-state image capturing device according to
claim 1, wherein the first pixel further includes a third transfer
transistor including a source and a drain, one of which
is connected to the other of the source or the drain of
the second transfer transistor, and an other of which is
connected to the floating diffusion.

6. The solid-state image capturing device according to
claim 1, wherein the first pixel further includes:

a second photoelectric converter that converts received
light into a second signal charge;

a second charge accumulator constituted by a capacitor
that includes a second one electrode and a second
other electrode and that accumulates the second
signal charge in the second one electrode;

a fourth transfer transistor including a source and a
drain, one of which is connected to the second
photoelectric converter and an other of which is
connected to the floating diffusion; and a fifth transfer transistor including a source and a drain,
one of which is connected to the second one electrode, and an other of which is connected to the other
of the source or the drain of the second transfer
transistor.

7. The solid-state image capturing device according to
claim 1, wherein one or more first pixels are disposed in each of
columns of the pixel array, the one or more first pixels
each being the first pixel, and the solid-state image capturing device further comprises a
plurality of variable voltage sources in one-to-one
correspondence with the columns of the pixel array, the
plurality of variable voltage sources each exclusively
selecting one voltage among a first voltage at a same
potential as a potential of the first power supply line and
a second voltage at a potential different from the
potential of the first power supply line, and each
outputting the one voltage to the first other electrode in
each of the one or more first pixels disposed in a
corresponding one of the columns.

8. The solid-state image capturing device according to
claim 1, wherein the drain of the amplifying transistor is connected
to a second power supply line that is not connected to
the first power supply line in the pixel array.

9. The solid-state image capturing device according to
claim 3, wherein a plurality of first pixels, each of which is the first
pixel, and a plurality of second pixels, each being the
second pixel, are provided, the plurality of first pixels are irradiated with light of a
first color passing through a color filter that filters light
passing through the color filter, and the plurality of
second pixels are irradiated with light of a second color
passing through the color filter, the second color being
different from the first color, and for each second pixel among the plurality of second
pixels, a relative positional relationship between the
second pixel and a first pixel located closest to the
second pixel is identical throughout the pixel array.

10. A control method for controlling the solid-state image
capturing device according to claim 5, the control method
comprising:

a first process of raising a drive signal RS applied to a gate
of the reset transistor and a drive signal GC applied to
a gate of the third transfer transistor from a logic level
LOW to a logic level HIGH, and subsequently raising
a drive signal TG applied to a gate of the first transfer
transistor from the logic level LOW to the logic level
HIGH;

a second process, performed after the first process, of
lowering the drive signal TG from the logic level HIGH
to the logic level LOW, and then lowering the drive
signal RS and the drive signal GC from the logic level
HIGH to the logic level LOW;

a third process, performed after the second process, of
raising the drive signal RS, a drive signal TGC applied
to a gate of the second transfer transistor, and a drive
signal PVDDSEL applied to a gate of the switching
transistor from the logic level LOW to the logic level
HIGH, and changing the first other electrode from a
predetermined set voltage lower than a potential of the
first power supply line to a power supply voltage at a
potential identical to the potential of the first power
supply line; and a fourth process, performed after the third process, of
lowering the drive signal RS from the logic level HIGH
to the logic level LOW, and then lowering the drive signal TGC and the drive signal PVDDSEL from the logic level HIGH to the logic level LOW and changing the first other electrode from the power supply voltage to the predetermined set voltage.

* * * * *